(12) United States Patent
Kim et al.

(10) Patent No.: US 10,867,179 B2
(45) Date of Patent: Dec. 15, 2020

(54) MOBILE TERMINAL AND METHOD FOR CONTROLLING THE SAME

(71) Applicant: LG Electronics Inc., Seoul (KR)

(72) Inventors: Sangwon Kim, Seoul (KR); Kyunglack Kim, Seoul (KR)

(73) Assignee: LG Electronics Inc., Seoul (KR)

(\*) Notice: Subject to any disclaimer, the term of this patent is extended or adjusted under 35 U.S.C. 154(b) by 122 days.

(21) Appl. No.: 15/975,571

(22) Filed: May 9, 2018

(65) Prior Publication Data

US 2018/0373936 A1 Dec. 27, 2018

(30) Foreign Application Priority Data

Jun. 22, 2017 (KR) ........................ 10-2017-0079268

(51) Int. Cl.
*G06K 9/00* (2006.01)
*G01S 19/01* (2010.01)
*G06Q 30/02* (2012.01)
*G06Q 50/30* (2012.01)
*G06Q 10/06* (2012.01)
(Continued)

(52) U.S. Cl.
CPC .......... *G06K 9/00671* (2013.01); *G01S 19/01* (2013.01); *G06K 9/00228* (2013.01); *G06K 9/00369* (2013.01); *G06Q 10/02* (2013.01); *G06Q 10/06* (2013.01); *G06Q 10/101* (2013.01);
(Continued)

(58) Field of Classification Search
CPC ................ G01S 19/01; G06K 9/00228; G06K 9/00369; G06K 9/00671; G06Q 10/02; G06Q 10/06; G06Q 10/101; G06Q 30/0284; G06Q 50/30
See application file for complete search history.

(56) References Cited

U.S. PATENT DOCUMENTS

2007/0182537 A1\* 8/2007 Abe ........................ B60K 37/02
340/462
2011/0060480 A1\* 3/2011 Mottla ................... G06Q 10/02
701/2
(Continued)

FOREIGN PATENT DOCUMENTS

JP 2014203192 A 10/2014
JP 2016218894 A 12/2016
(Continued)

OTHER PUBLICATIONS

Search Report in European Patent Application No. 18177643.6, dated Sep. 10, 2018, 7 pages.

*Primary Examiner* — Helen Zong
(74) *Attorney, Agent, or Firm* — Fish & Richardson P.C.

(57) ABSTRACT

The present disclosure may include a mobile terminal and a control method thereof, and the mobile terminal may include a display unit configured to display a map image in a predetermined range around a predetermined point; a wireless communication unit configured to receive at least one carsharing schedule set within the predetermined range from a server; and a controller configured to control the display unit so that a graphic object corresponding to the carsharing schedule is displayed on the map image when the carsharing schedule is received, wherein the controller controls the display unit so that the graphic object disappears when a predetermined time is left from a departure time of the carsharing schedule.

16 Claims, 34 Drawing Sheets

(51) Int. Cl.
*G06Q 10/10* (2012.01)
*G06Q 10/02* (2012.01)
(52) U.S. Cl.
CPC ......... *G06Q 30/0284* (2013.01); *G06Q 50/30* (2013.01)

(56) References Cited

U.S. PATENT DOCUMENTS

| | | | | |
|---|---|---|---|---|
| 2011/0225269 | A1* | 9/2011 | Yap | G06Q 10/06 709/219 |
| 2012/0314916 | A1* | 12/2012 | Rothschild | G06K 9/00288 382/118 |
| 2014/0058896 | A1* | 2/2014 | Jung | G06Q 10/02 705/26.61 |
| 2015/0084883 | A1* | 3/2015 | Kim | G06F 3/0416 345/173 |
| 2015/0221048 | A1* | 8/2015 | Zenhausern | G06Q 50/14 705/26.5 |
| 2016/0027079 | A1* | 1/2016 | Schoeffler | H04N 5/23293 705/325 |
| 2017/0075358 | A1 | 3/2017 | Zhang | |
| 2017/0153714 | A1* | 6/2017 | Gao | G06F 3/017 |
| 2018/0088445 | A1* | 3/2018 | Michaud | G03B 29/00 |
| 2018/0357912 | A1* | 12/2018 | Kessler | G08G 7/00 |
| 2020/0013020 | A1* | 1/2020 | Yang | G06Q 50/30 |

FOREIGN PATENT DOCUMENTS

| | | |
|---|---|---|
| KR | 2014055110 A | 5/2014 |
| KR | 2015044064 A | 4/2015 |
| WO | 2017054672 | 4/2017 |
| WO | 2017054706 | 4/2017 |

\* cited by examiner

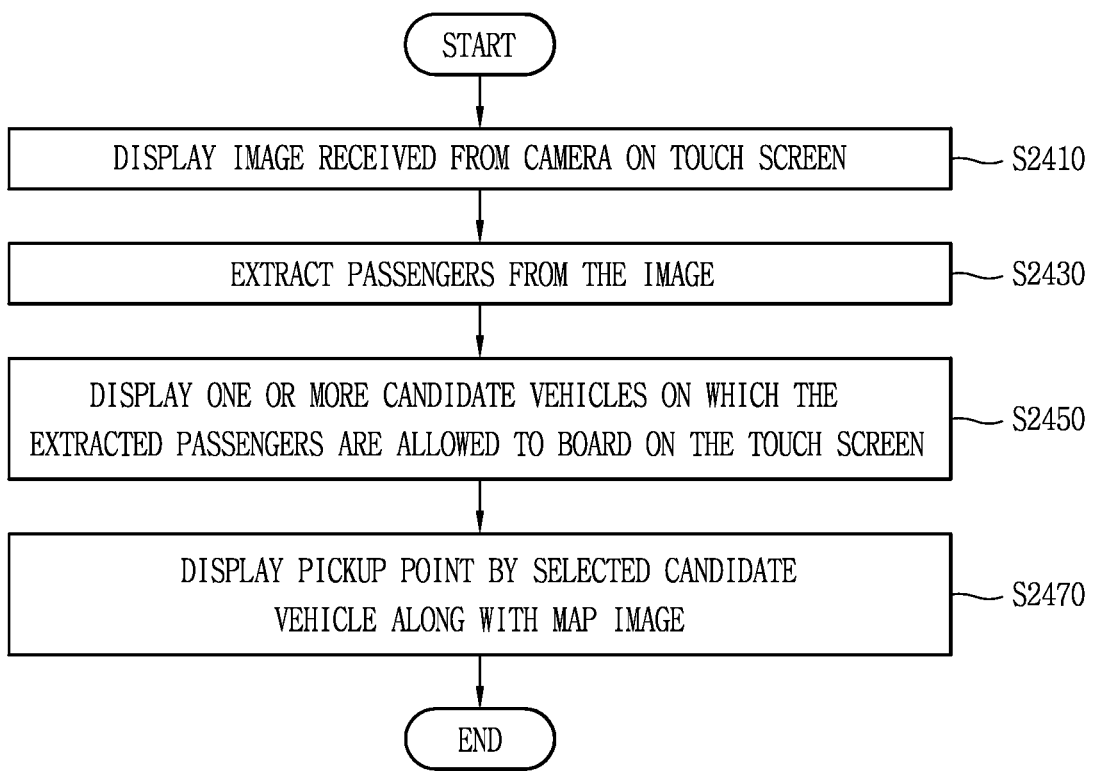

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0079268, filed on Jun. 22, 2017, the contents of which is incorporated by reference herein in its entirety.

BACKGROUND OF THE INVENTION

1. Field of the Invention

The present disclosure relates to a transportation system, and more particularly, to a mobile terminal included in the transportation system to link between a driver and a passenger, and a control method thereof.

2. Description of the Related Art

Terminals may be divided into mobile/portable terminals and stationary terminals according to their mobility. Furthermore, the mobile terminal can be further classified into two types, such as a handheld terminal and a vehicle mount terminal based on whether or not it can be directly carried by a user.

Mobile terminals have become increasingly more functional. For example, there are functions of data and voice communication, photo capture and video capture through a camera, voice recording, music file reproduction through a speaker system, and displaying an image or video on the display unit. Some terminals include additional electronic game play functions or perform a multimedia player function. In particular, recent mobile terminals may receive multicast signals for providing visual contents such as broadcasts, videos, television programs or the like.

As it becomes multifunctional, for example, such a terminal is allowed to capture still images or moving images, play music or video files, play games, receive broadcast and the like, so as to be implemented as an integrated multimedia player.

Due to the improvement of mobile terminals, various shared economic services using mobile terminals are being developed. Shared economy refers to the economy of sharing such as borrowing and lending production facilities and services as well as goods, as needed.

A representative example of a shared economy is transportation services. The transportation service means a service in which a driver uses his or her own vehicle to move a passenger from a departure to a destination. The transportation service as a shared economy is being developed in the direction of mediating between any driver who is a vehicle provider and any passenger who is a vehicle user.

The transportation service is provided by a transportation system, which includes a client terminal, a driver terminal, and a server mediating between the client terminal and the driver terminal.

For example, a passenger may request a vehicle to a specific point using the client terminal, the server may select a driver to provide the vehicle for the passenger, and request a reservation to the driver terminal of the selected driver. The driver terminal of the selected driver provides the driver with the request of the server to perform mediation between the passenger and the driver.

In order for a transport service to play its role as a shared economy, simple linking between passengers and vehicles should be further developed in the direction of sharing one vehicle by more people.

In addition, a variety of user interfaces (UIs) must be developed to provide convenience to passengers and drivers, respectively, with transportation services.

SUMMARY OF THE INVENTION

An object of the present disclosure is to solve the above-mentioned problems and other problems. Another object of the present disclosure is to provide a mobile terminal capable of providing a new type of transportation service and a control method thereof. Furthermore, still another object of the present disclosure is to provide a transportation system including the mobile terminal.

In addition, yet still another object of the present disclosure is to provide a mobile terminal and a control method thereof capable of providing convenience to a passenger as well as providing convenience to a driver who provides a transportation service to the passenger.

In order to accomplish the foregoing or other objects, according to an aspect of the present disclosure, there is provided a control method of a transportation system.

Specifically, the present disclosure relates to a control method of a transportation system including a server configured to mediate between a client terminal and a driver terminal, wherein the control method of the transportation system includes generating a passenger condition of the driver terminal based on a user input; and selectively transmitting a reservation request to the driver terminal according to whether a vehicle request matches the passenger condition of the driver terminal when the vehicle request is received from the client terminal. It is to allow a driver to select a passenger type (or passenger condition) that the driver prefers.

According to an embodiment, the passenger condition may include at least one of a sex, an age, a nationality, a passenger boarding region and a passenger getting-off region of a passenger preferred by a user of the driver terminal.

According to an embodiment, the control method of the transportation system may further include allowing the driver terminal to display a screen including the passenger condition of the driver terminal on a display of the driver terminal; and allowing the driver terminal to reset the passenger condition of the driver terminal based on a user input applied to the screen. Through this, the driver may change the passenger condition to be optimized for himself or herself.

According to an embodiment, the control method of the transportation system may further include allowing the server to mediate between the driver terminal and the client terminal when the driver terminal approves the reservation request; allowing the server to search for a pickup point based on the location of the driver terminal and the location of the client terminal; and allowing the client terminal to display the pickup point on a display of the client terminal. It is to guide a boarding location (or pickup point) to the passenger for efficient boarding.

According to an embodiment, the control method of the transportation system may further include allowing the client terminal to display an authentication screen configured for the driver to identify the passenger on a display of the client terminal when the driver terminal and the client terminal are located within a predetermined range. The driver may quickly confirm the passenger to board his or her car through the authentication screen of the client terminal.

According to an embodiment, the control method of the transportation system may further include calculating a ride comfort index of the passenger through a sensor provided in the client terminal, and transmitting the ride comfort index to the server when the passenger boards the driver's vehicle.

According to an embodiment, the control method of the transportation system may further comprise classifying the driver terminal into any one of a plurality of groups based on the ride comfort index received from the client terminal. Through this, the server may collect objective data for evaluating the driver using the client terminal, and evaluate the driver from the viewpoint of the passenger.

According to an embodiment of the present disclosure, the control method of the transportation system may further comprise dividing a predetermined region into a first region in which passengers are insufficient and a second region in which vehicles is insufficient based on information received at the server; allowing the server to transmit information on at least one of the first region and the second region to the driver terminal; and allowing the driver terminal to output driver guide information for guiding the second region in at least one of visual, auditory, and tactile manners when the driver terminal is located in the first region. Since information generated by big data is used for efficient deployment of vehicles, the driver may minimize consuming time without any passengers and generate more revenue.

The first region may be a region in which a number of passengers matching a passenger condition of the driver terminal is less than a first reference value, and the second region is a region in which a number of passengers matching a passenger condition of the driver terminal is greater than a second reference value, contrary to the first region. At least one of the first region and the second region is changed according to a passenger condition set by the driver.

Distinguishing the predetermined region may include allowing the driver terminal to receive a predetermined time zone and transmit the received time zone to the server; and allowing the server to divide the predetermined region into the first region and the second region based on the predetermined time zone, and at least one of the first region and the second region may vary depending on the predetermined time zone. It may allow the driver to visually identify a time zone in which he or she can make the best profit.

Outputting the driver guide information may include displaying a map image including a point at which the driver terminal is located on a display of the driver terminal; and allowing the driver terminal to display a graphic object for guiding the second region on the map image. The visibility of the first and second regions may be provided through the map image.

The driver guide information may be route guide information having one point of the second region as a destination of the driver terminal. It allows the driver to naturally move the vehicle to a point where more profit can be generated.

Outputting the driver guide information may further include allowing the driver terminal or the server to search for a point at which the vehicle is able to park in the second region and setting the searched point to the destination.

First expected revenue in the first region and second expected revenue in the second region may be displayed on the map image. As an expected revenue is provided to the driver, the drivers movement may be induced.

The driver guide information may be output when the driver terminal is located in the first region and the reservation request is not transmitted to the driver terminal for a reference time.

The control method of the transportation system may further comprise allowing the server to transmit information on at least one of the first region and the second region to the client terminal; and allowing the client terminal to output passenger guide information for guiding the first region in at least one of visual, auditory, and tactile manners when the driver terminal is located in the second region.

Outputting the passenger guide information may display a map image including a point at which the client terminal is located on a display of the client terminal; and allowing the client terminal to display a graphic object for guiding the first region on the map image. A passenger may not vaguely wait for a vehicle to be assigned, but may be able to identify a region where a vehicle can be assigned more quickly and move to the region.

The passenger guide information may be route guide information having one point of the first region as a destination of the client terminal.

Outputting the passenger guide information may include allowing the client terminal or the server to search for another transportation means for moving to one point of the first region; and allowing the client terminal to guide the searched transportation means. Through this, the convenience of passengers may be increased.

At least one of the driver terminal and the client terminal may perform the steps of displaying a map image in a predetermined range around a predetermined point on its own display; displaying a graphic object corresponding to a carsharing schedule on the map image when receiving at least one carsharing schedule set within the predetermined range from the server; and controlling the own display so that the graphic object disappears when a predetermined time is left from a departure time of the carsharing schedule.

Furthermore, according to another aspect of the present disclosure, there is provided a mobile terminal included in the transportation system.

Specifically, the mobile terminal may include a display unit configured to display a map image in a predetermined range around a predetermined point; a wireless communication unit configured to receive at least one carsharing schedule set within the predetermined range from a server; and a controller configured to control the display unit so that a graphic object corresponding to the carsharing schedule is displayed on the map image when the carsharing schedule is received, wherein the controller controls the display unit so that the graphic object disappears when a predetermined time is left from a departure time of the carsharing schedule.

According to an embodiment, the mobile terminal may further include a sensing unit configured to sense a current position, and the predetermined time period may vary depending on the current position. The vehicle may start moving at a departure time, but may not recommend sharing to the user unless the user of the terminal can reach a departure place by the departure time. In this manner, the user may be provided with only necessary information considering a travel time.

According to an embodiment, the controller may calculate an estimated travel time period from the current location to the departure place of the carsharing schedule, and determine the predetermined time period based on the calculated travel time period.

According to an embodiment, the graphic object may be displayed at a position corresponding to the departure place of the carsharing schedule, and may include an estimated fare to be charged at the time of carsharing.

According to an embodiment, the graphic object may further include a comparison fare to be charged when using the same vehicle alone without carsharing. As a result, the user of the terminal may determine carsharing or single movement through the price comparison.

According to an embodiment, when a generation function for generating a to new carsharing schedule is executed, the controller may control the display unit to display an execution screen for receiving at least one of a departure place, a destination place, a departure time, and a number of invited carsharing riders, generate a new carsharing schedule based on the received information, and control the wireless communication unit to register the generated carsharing schedule in the server.

According to an embodiment, an estimated fare per person varies according to the number of invited carsharing riders, and the fare information calculated by the estimated fare per person may be displayed on the execution screen. The user of the terminal is visually provided with economic gain due to carsharing.

According to an embodiment, the controller may control the display unit to display the detailed information of the carsharing schedule when a touch is applied to the graphic object, and the detailed information may include information on one or more passengers reserved in the carsharing schedule. Through this, the user of the terminal may share the information of persons who use a vehicle together through carsharing.

According to an embodiment, the detailed information includes a seat position for each of the one or more passengers, and the seat position assigned to each passenger may be changed according to the destination of each passenger. Since an optimal seat arrangement is achieved according to the destination, a damage caused by passengers having different destinations as other passengers is prevented in advance.

Furthermore, the present disclosure may provide a control method of controlling a mobile terminal to provide a transportation service. The control method may include controlling a camera and a touch screen of the mobile terminal to display an image received from the camera of the mobile terminal; extracting a passenger to use the transportation service from the image; requesting a candidate vehicle on which the extracted passenger is allowed to board to a preset server using a wireless communication unit of the mobile terminal; and controlling the touch screen to display one or more candidate vehicles capable of providing the transportation service based on information received from the server, wherein the one or more candidate vehicles vary depending on the characteristics of the extracted passenger.

According to an embodiment, the control method may further include searching for baggage from the image, wherein when the baggage is searched, the one or more candidate vehicles are vehicles on which a number of the extracted passengers are allowed to board while the baggage can be loaded.

According to an embodiment, the control method may further include displaying the baggage on the touch screen to display a storage compartment image of the candidate vehicle on which the baggage can be loaded when the baggage is searched.

According to an embodiment, the control method may further include displaying a graphic object corresponding to the searched baggage with the storage compartment image, and setting a point at which the searched baggage is to be loaded based on a position displayed with the graphic object.

According to an embodiment, the storage compartment image may be divided into a first region in which baggage is scheduled to be loaded and a second region in which the baggage is not scheduled to be loaded, and a guide image for guiding the first region may be displayed on the storage compartment image.

According to an embodiment, the storage compartment image may be an image captured by a camera disposed in a trunk of the candidate vehicle.

According to an embodiment, the characteristics of the extracted passenger may vary depending on whether the camera is a front camera disposed on a front surface of the mobile terminal or a rear surface camera disposed on a rear surface of the mobile terminal.

According to an embodiment, the control method may further include controlling the touch screen to display a guide line for guiding passenger extraction on the image, wherein the passenger extraction is carried out in at least one region defined by the guide line within an entire region of the image.

According to an embodiment, the control method may further include controlling the touch screen to modify the guide line based on a touch input applied to the guide line; and re-extracting the passenger based on the modified guide line.

According to an embodiment, the control method may further include selecting any one of the one or more candidate vehicles based on a user input; and transmitting a reservation request of a transportation service for the selected candidate vehicle to the server.

According to an embodiment, the control method may further include displaying an authentication screen configured to allow a driver of the selected candidate vehicle to identify a user of the mobile terminal on the touch screen when the selected candidate vehicle and the mobile terminal are located within a predetermined range.

According to an embodiment, the control method may further include controlling the touch screen to display an image received from the camera subsequent to transmitting the reservation request; and displaying a pickup point guide image for guiding a region where the selected candidate vehicle can park in the image on the image.

According to an embodiment, the control method may further include setting a pickup point of the selected candidate vehicle based on a user input applied to the pickup point guide image.

Furthermore, according to an aspect of the present disclosure, there is provided a control method of controlling the operation of the foregoing mobile terminal. The control method may be carried out by an application stored in a storage means such as a memory of the mobile terminal.

According to a transportation system of the present disclosure, a driver may set his or her preferred type of passenger using a passenger condition and selectively receive only a reservation request of the passenger satisfying the passenger condition. As a result, a driver-friendly user interface may be provided. In addition, the driver may set his or her optimized passenger condition, and reset the passenger condition anytime and anywhere.

A transportation system according to the present disclosure may guide a passenger crowded region or a no passenger region for a certain area in the vicinity from a point where the driver is located, and guide the driver to a region where the revenue is maximized. Through this, the driver may visually confirm at which point and at which time zone there is a large number of passengers. Furthermore, a plurality of vehicles may be efficiently deployed by big data.

According to the present disclosure, a passenger who wants to use the transportation service may create his or her own carsharing schedule. Since the sharing schedule is shared with a third party, the passenger may not only book his or her own vehicle in advance, but also collect passengers to use the vehicle together. As a result, the passenger may lower the cost, and the driver may plan a transportation schedule and increase the revenue.

According to the present disclosure, an optimal seating arrangement may be determined according to the destination of each of passengers using carsharing, and the determined seating arrangement may be guided through the terminal of each of the passengers. Through this, the passengers may be seated at optimal seats suitable for their destinations, thereby preventing the inconvenience of carsharing in advance.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 24 is a flowchart for explaining a method of setting a condition of a vehicle request by a client terminal;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
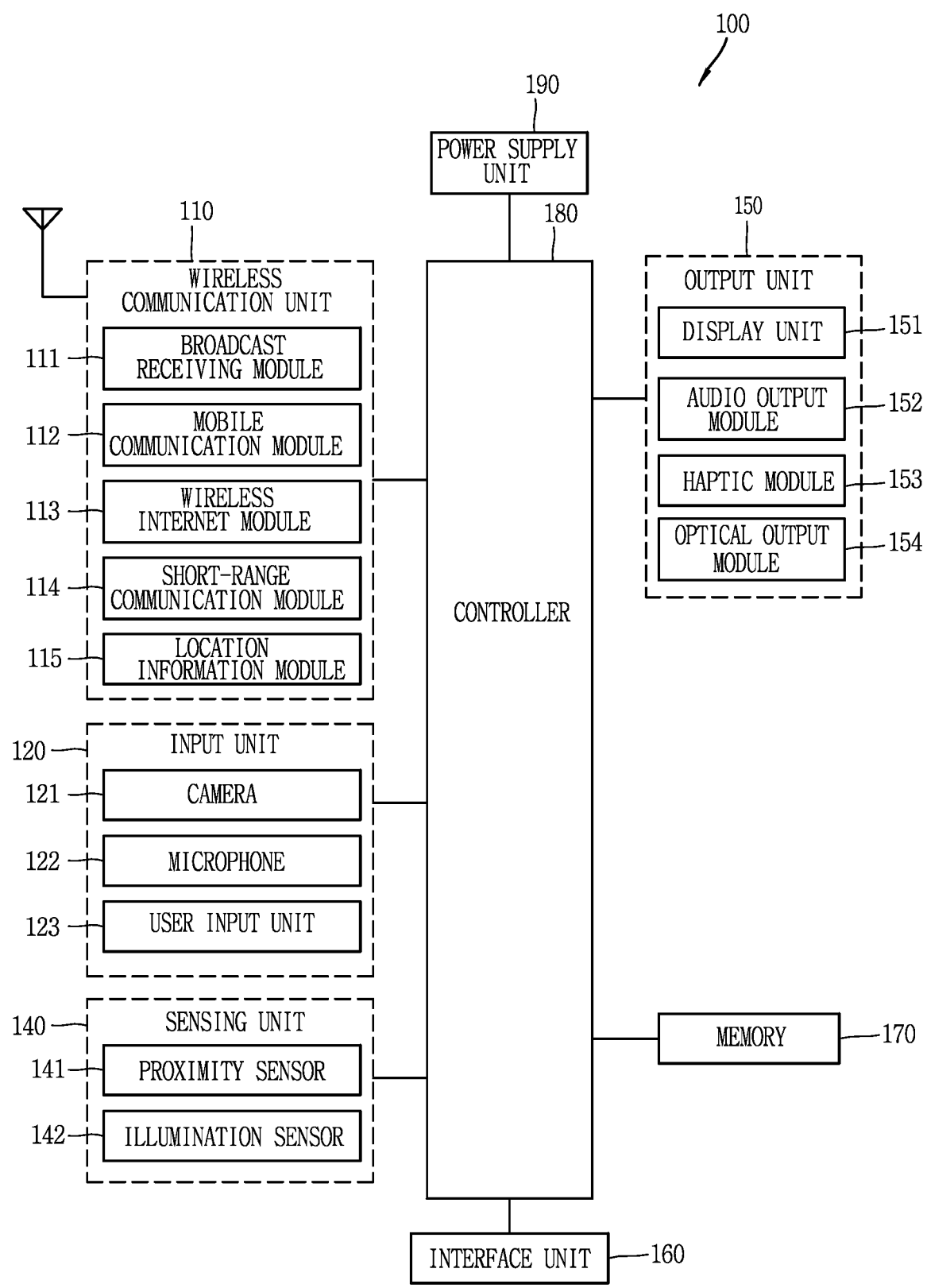
FIG. 1A is a block diagram for explaining a mobile terminal associated with the present disclosure.
Figure 1B:
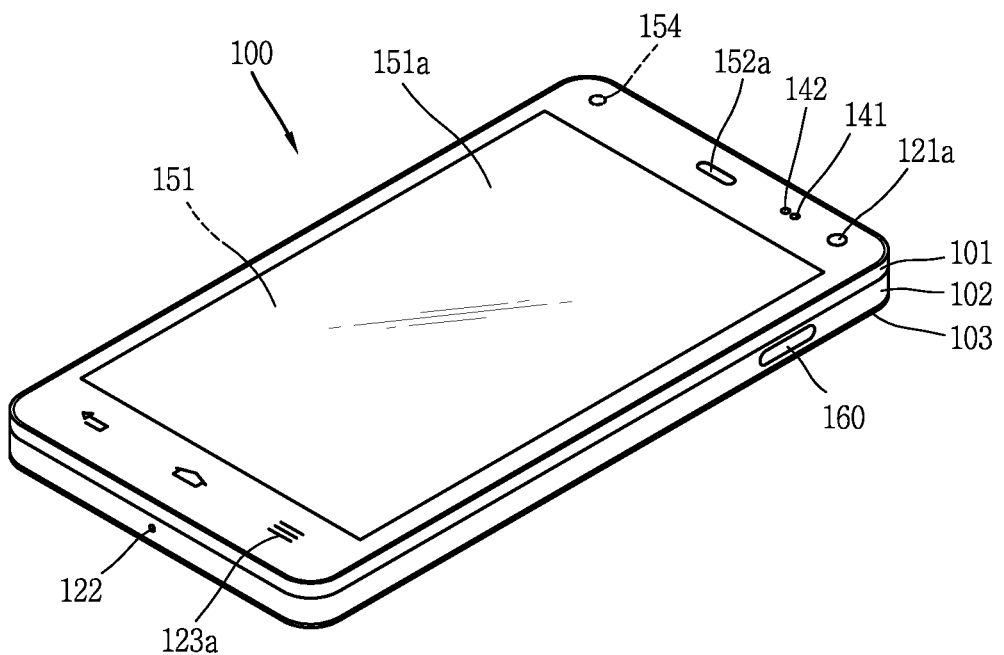
FIGS. 1B through 1C are conceptual views illustrating an example in which a mobile terminal associated with the present disclosure is seen from different directions.
Figure 1C:
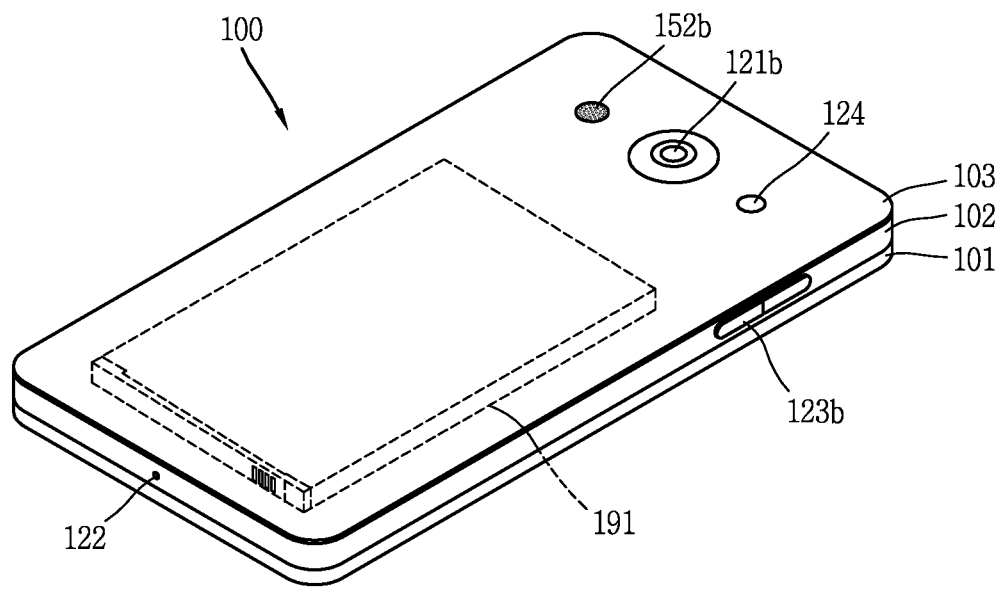

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. In addition, the wireless communication unit 110 may include one or more modules that connect the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, (G-sensor), gyroscope sensor, motion sensor, RGB sensor, infrared sensor (IR sensor: An infrared sensor, a finger scan sensor, an ultrasonic sensor, an optical sensor (for example, see camera 121), a microphone (see 922), a battery gauge), An environmental sensor (for example, a barometer, a hygrometer, a thermometer, a radiation sensor, a heat sensor, a gas sensor, etc.), a chemical sensor (e.g., an electronic nose, a healthcare sensor, One may be included. The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices that can be coupled to the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data supporting various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, obtained by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a users direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or to release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 1B and 1C, the mobile terminal 100 is described with reference to a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 902, 903 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

In this manner, the display unit 151 may form a flexible touch screen along with the touch sensor, and in this case, the touch screen may function as the user input unit 123 (refer to FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving to module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may exchange data with (or cooperate with) another mobile terminal 100. The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Hereinafter, embodiments associated with a control method which can be implemented in the mobile terminal having the foregoing configuration will be described with reference to the attached drawings. It is obvious to those skilled in the art that the present features can be embodied in several forms without departing from the characteristics thereof.

In the following description, the drawings will be described in sequence in a clockwise direction or described in sequence from the top to the bottom based on the upper left drawing.

Figure 2:
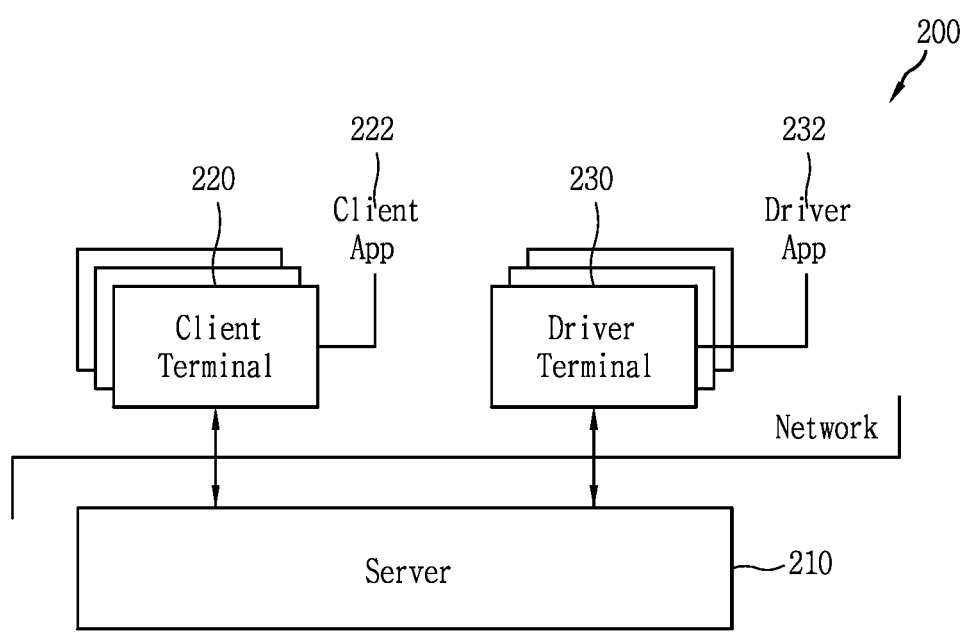
FIG. 2 is a block diagram for explaining a transportation system of the present disclosure.

FIG. 2 is a block diagram for explaining a transportation system of the present disclosure;

The transportation system 200 includes a server 210, a client terminal 220 installed with a passenger application 222, and a driver terminal 230 installed with a driver application 232.

Here, the client terminal 220 and the driver terminal 230 correspond to an example of the mobile terminal described above with reference to FIGS. 1A through 1C. Hereinafter, the term terminal denotes either one of the client terminal 220 and the operation terminal 230.

The control method of the transportation system described below may be carried out through applications provided in the client terminal 220 and the driver terminal 230, respectively. Specifically, the operation of the client terminal 220 may be executed through the passenger application 222, and the operation of the driver terminal 230 may be executed through the driver application 232.

The transport system 200 is intended to provide transportation services to any passenger through any driver. Reservation, mediation, contact, transport and driver assessment may be done through the transportation system 200.

A reservation of a transportation service denotes allowing a passenger to request a vehicle to a departure point using the client terminal 220. This request is referred to as a "vehicle request," and the vehicle request is transmitted to the server 210. The vehicle request may include a destination point to which the passenger wants to move, a type of vehicle, and a type of service the passenger wants to use. In other words, the vehicle request includes a condition of the vehicle request, and the server 210 searches for a candidate vehicle that matches the condition of the vehicle request, and transmits a reservation request to the searched candidate vehicle.

The type of vehicle includes information related to the vehicle itself and an article contained in the vehicle. The information related to the vehicle itself may be a two-seater, a four-seater, a convertible, or the like, and the article contained in the vehicle may be a refrigerator, a wheelchair, an umbrella, or the like. For example, when a vehicle request for a vehicle containing a refrigerator with a two-seater is received, the server searches for a vehicle that satisfies the type of vehicle.

The type of service refers to a service provided through a vehicle. The type of the service may be a single ride service that uses a vehicle alone, a carsharing service that shares a vehicle with any third party, and the like.

In the present disclosure, carsharing may be referred to as ride-sharing, but may also be referred to as vehicle-sharing, car-sharing, carpool, or the like.

Mediation denotes that the server 210 assigns at least one vehicle to a passenger who has made a vehicle request in response to the vehicle request. Specifically, the server 210 searches for one or more driver terminals located within a predetermined range with respect to the position of the client terminal 220, and requests a reservation for the driver terminal. This request is referred to as a "reservation request." Then, when any one driver terminal 230 approves the reservation request, a mediation between the driver terminal 230 and the client terminal 220 is carried out. Through the mediation, the client terminal and the driver terminal are connected to each other to share various information for providing the service. For example, the location of each terminal may be shared with each other.

A contact denotes a mediation meeting between the driver and the passenger. Various functions for a contact are executed in the client terminal 220 and the driver terminal 230 until boarding is carried out after the mediation is carried out. For example, a route moving to a departure point may be displayed on the driver terminal 230, and a time period remaining until the vehicle arrives at the departure point may be displayed on the client terminal 220.

Transportation denotes moving from a departure point to a destination point after boarding is carried out. The passenger may change a route to the destination using his or her own client terminal 220 while moving, change the destination point itself, or set a waypoint. In this case, the client terminal 220, the server 210, and the driver terminal 230 operate organically, thereby changing the route and providing a transportation service to the changed route.

Driver assessment means that a passenger evaluates a driver during transportation or after getting off. For example, a user interface that can evaluate the driver may be displayed on the client terminal 220 during transportation or after getting off. When a passenger evaluates a driver through the client terminal 220, the server 210 may stores the evaluation for the driver and classify the driver using the stored big data.

Each component of the transportation system 200 may be organically coupled to process location information generated from each terminal and provide a transportation service using the location information. Each of the components 210-230 of the transportation system 200 may exchange data with each other via a network, and may be organically connected to perform various functions associated with a transportation service.

The logic of a transportation service may be implemented by various applications and/or hardware installed in each component. Specifically, the operation of the client terminal 220 may be executed through the passenger application 222, and the operation of the driver terminal 230 may be executed through the driver application 232.

The server 210 is configured to mediate between the client terminal 220 and the driver terminal 230. The server 210 may include a passenger database, a driver database, and a map database.

When a vehicle request is received from the client terminal 220, the server 210 may select one or more driver terminals that satisfy a predetermined condition based on the position of the client terminal 220, and transmit a reservation request to the selected driver terminal. At this time, a driver terminal located within a predetermined distance from a departure point or within a predetermined time period required to move to the departure point may be selected.

When any one driver terminal 230 that has received a reservation request approves the reservation request, the client terminal 220 and the driver terminal 230 execute a predetermined function to implement a contact between the passenger and the driver. In order to perform the predetermined function, the driver terminal 230 and the client terminal 220 may transmit and receive respective position information directly or indirectly through the server 210.

The client terminal 220 may display a position of the vehicle and a time period required for the vehicle to reach the departure point. Alternatively, the driver terminal 230 may display route guide information for leading the vehicle to the departure point. A travel path of the vehicle may be calculated by the server 210 or the driver terminal 230.

When a passenger boards a vehicle, the driver terminal 230 and/or the client terminal 220 may transmit a board report to the server 210. Then, transportation is carried out to the destination point, and cost is calculated according to at least one of a transportation distance and a transportation time. The cost may be calculated differently depending on the type of a vehicle and/or the type of a service provided in the transportation. The calculated cost will be paid by a pre-registered credit card or electronic money.

Figure 3:
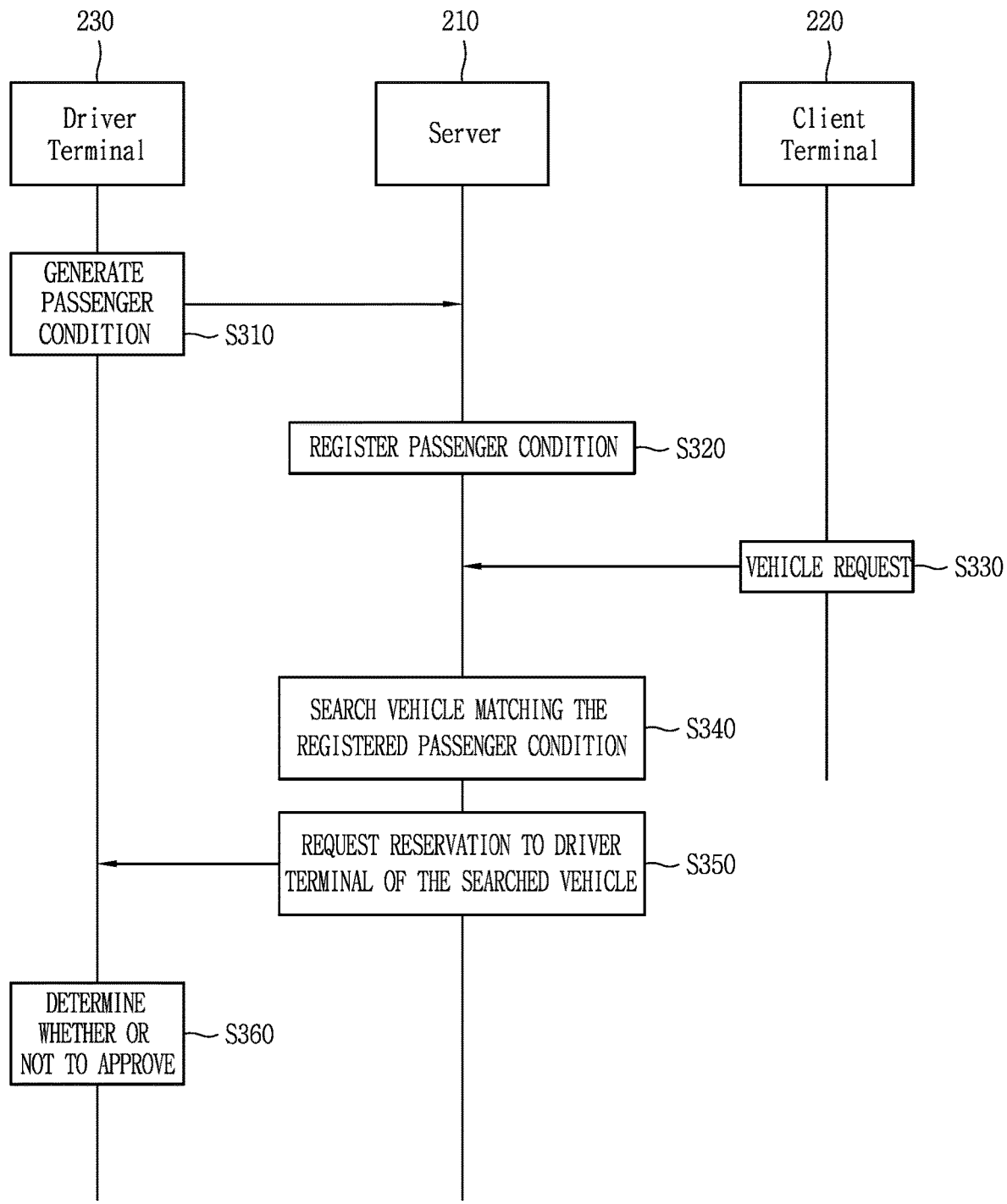
FIG. 3 is a flowchart for explaining a method of matching a passenger who is preferred to a driver, as an example of a control method carried out by the transportation system of FIG. 2.

Referring to FIG. 3, a control method provided by the transportation system 200 will be described in detail.

FIG. 3 is a flowchart for explaining a method of matching a passenger who is preferred to a driver, as an example of a control method carried out by the transportation system of FIG. 2.

First, the driver terminal 230 generates a passenger condition of the driving terminal 230 based on a user input (S310). The generated passenger condition is transmitted to the server 210, and the server 210 registers the passenger condition (S330).

Here, the passenger condition or passenger criteria denotes a condition in which a type of passenger who is intended by a user of the driver terminal 230, namely, a driver, to provide a transportation service, is determined in advance. When the passenger condition is set, a reservation request of a passenger matching the passenger condition is selectively transmitted to the driver terminal.

The passenger condition denotes a condition set by a driver's active intention. The passenger condition may be set differently according to the driver, and the passenger condition may be stored and managed in a driver database.

Assuming that the driver terminal can receive reservation requests from M passengers when the passenger condition is not set, the driver terminal may receive reservation requests from N passengers less than the M passengers that satisfy the passenger condition among the M passengers when the passenger condition is set. Among the M reservation requests, N reservation requests satisfying the passenger condition are transmitted to the driver terminal, and the remaining reservation requests that do not satisfy the passenger condition are filtered and not transmitted to the driver terminal. Accordingly, the driver may set his or her own passenger condition to selectively receive only a reservation request of his or her preferred passenger.

The passenger condition may include at least one of the sex, age, nationality, usable language, passenger boarding region and passenger getting-off region of a passenger preferred by the user (or driver) of the driver terminal 230.

On the other hand, the driver terminal 230 may output a user interface for generating a passenger condition through the driver application 232. For example, a passenger condition setting screen may be displayed on a display of the driver terminal 230, and the passenger condition may be generated by a touch input or various user inputs applied to the passenger condition setting screen.

When a vehicle request is received from the client terminal 220 (S330), the server 210 searches for a vehicle matching the registered passenger condition in response to the vehicle request (S340).

The server 210 searches for one or more driver terminals located within a predetermined range based on the departure point of the client terminal 220 included in the vehicle request. When the passenger condition is registered in the searched driver terminal, the server 210 judges whether the vehicle request matches the passenger condition of the searched driver terminal, and determines whether or not to transmit a reservation request.

When the vehicle request of the client terminal 220 matches the passenger condition of the driver terminal 230, the server 210 transmits a reservation request to the driver terminal 230 (S350). Unless the vehicle request of the client terminal 220 matches the passenger condition of the driver terminal 230, a reservation request is not transmitted to the driver terminal 230. In other words, when a vehicle request is received from the client terminal 220, the server 210 selectively transmits a reservation request to the driver terminal 230 according to whether the vehicle request matches the passenger condition of the driver terminal 230.

For example, when the driver sets "female only" as the passenger condition, only a reservation request of a female passenger is transmitted, but transmission for a reservation request of a male passenger is restricted.

For another example, when the driver sets a passenger getting-off point to "Gangnam", only a reservation request of the passenger whose destination is Gangnam is transmitted. When the passenger getting-off point is not Gangnam, the relevant reservation request will not be transmitted.

When it is determined that the vehicle request matches a plurality of driver terminals according to passenger conditions set for the driver terminals, respectively, a reservation request is transmitted to each of the plurality of driver terminals.

Next, the driver terminal 230 outputs information corresponding to the reservation request, and determines whether to accept the reservation request based on a user input (S360).

The reservation request may include at least one of a departure point, a destination point, a route from the departure point to the destination point, and an estimated fare. The driver may determine whether or not to approve the reservation request based on information displayed on the driver terminal 230.

When the reservation request is approved, an approval request is transmitted from the driver terminal 230 to the server 210. The server 210 mediates between the driver terminal 230 and the client terminal 220 in response to the approval request.

According to a transportation system of the present disclosure, a driver may set his or her preferred type of passenger using a passenger condition and selectively receive only a reservation request of the passenger satisfying the passenger condition. As a result, a driver-friendly user interface may be provided.

On the other hand, a vehicle providing a transportation service may be an autonomous driving vehicle capable of driving according to the control of the software without a driver.

In this case, a driver may set an autonomous driving vehicle or a manual driving vehicle on the passenger condition. When the passenger condition is set to an autonomous driving vehicle, the autonomous driving vehicle provides a transportation service in accordance with a driving command transmitted from the server 210. The autonomous driving vehicle and the driver terminal 230 may communicate with each other, and the driver may check the present status or reservation status of transportation services through the driver terminal 230. When set to a manual driving vehicle, a transportation service is provided only when a driver boards the vehicle, and the server 230 may determine whether or not the driver boards the vehicle using information transmitted from the driver terminal 230.

The driver may set the passenger condition to at least one of "private use time" in which the driver himself or herself uses the vehicle and "taxi use time" in which the driver allows a third party other than the driver himself of herself to use his or her vehicle.

The driver's vehicle may operate as an unmanned taxi during the taxi use time. The server 210 may take the control of the vehicle during a taxi use time according to the passenger condition to move the vehicle to the departure point of the client terminal 220, and move the vehicle to the destination point when the passenger is boarding. Then, when it becomes a private use time in which the driver has to use the vehicle, the server 210 may end the provision of the transportation service and move the vehicle to a point where the driver needs it. The server 210 may generate and manage a vehicle schedule for a taxi use time so that the driver can use the vehicle during a private use time.

Figure 4:
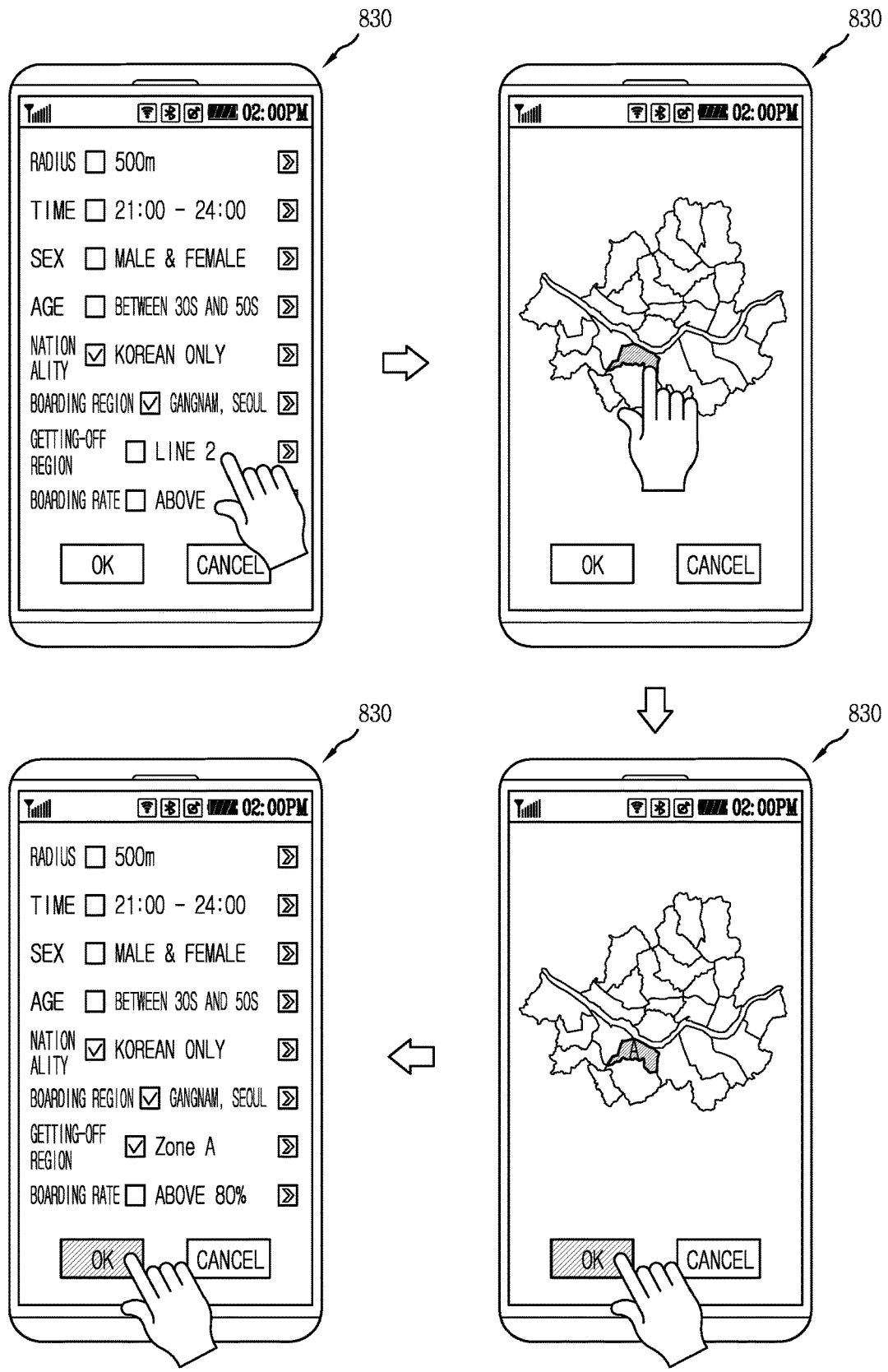
FIG. 4 is an exemplary view for explaining an operation of a driver terminal for resetting a passenger condition according to an embodiment of the present disclosure.

FIG. 4 is an exemplary view for explaining an operation of a driver terminal for resetting a passenger condition according to an embodiment of the present disclosure.

The driver terminal 230 may display a screen containing a passenger condition of the driver terminal 230 on a display of the driver terminal 230. Then, the driver terminal 230 may reset the passenger condition of the driver terminal 230 based on a user input applied to the screen. In other words, the driver terminal 230 may provide a user interface for setting a passenger condition or resetting a preset passenger condition.

For example, when a passenger condition setting mode is executed, the driver terminal 230 may display a passenger condition setting screen configured to set a passenger condition on the display unit.

The passenger condition setting screen may include a plurality of items corresponding to a passenger condition, and the driver terminal 230 may newly set or reset each item based on the touch input on the passenger condition setting screen.

For example, as illustrated in FIG. 4, when a touch is applied to a getting-off region item, a getting-off region setting screen for setting a getting-off region may be displayed. The getting-off region setting screen may include a map image divided into a plurality of zones. When a touch is applied to any one of the plurality of zones, the any one of the plurality of zones may be selected or deselected. When zone A is set as a getting-off region, only a reservation request whose destination is within the zone A is selectively transmitted to the driver terminal 230. The driver may set the getting-off region using a voice command or a virtual keypad displayed on the display of the driver terminal 230.

Through this, the driver may set his or her optimized passenger condition, and reset the passenger condition anytime and anywhere.

Meanwhile, the transportation system according to the present disclosure may guide the driver to maximize the revenue of the driver. A new type of user interface for maximizing revenue will be described in detail with reference to FIGS. 5 through 9.

Figure 5:
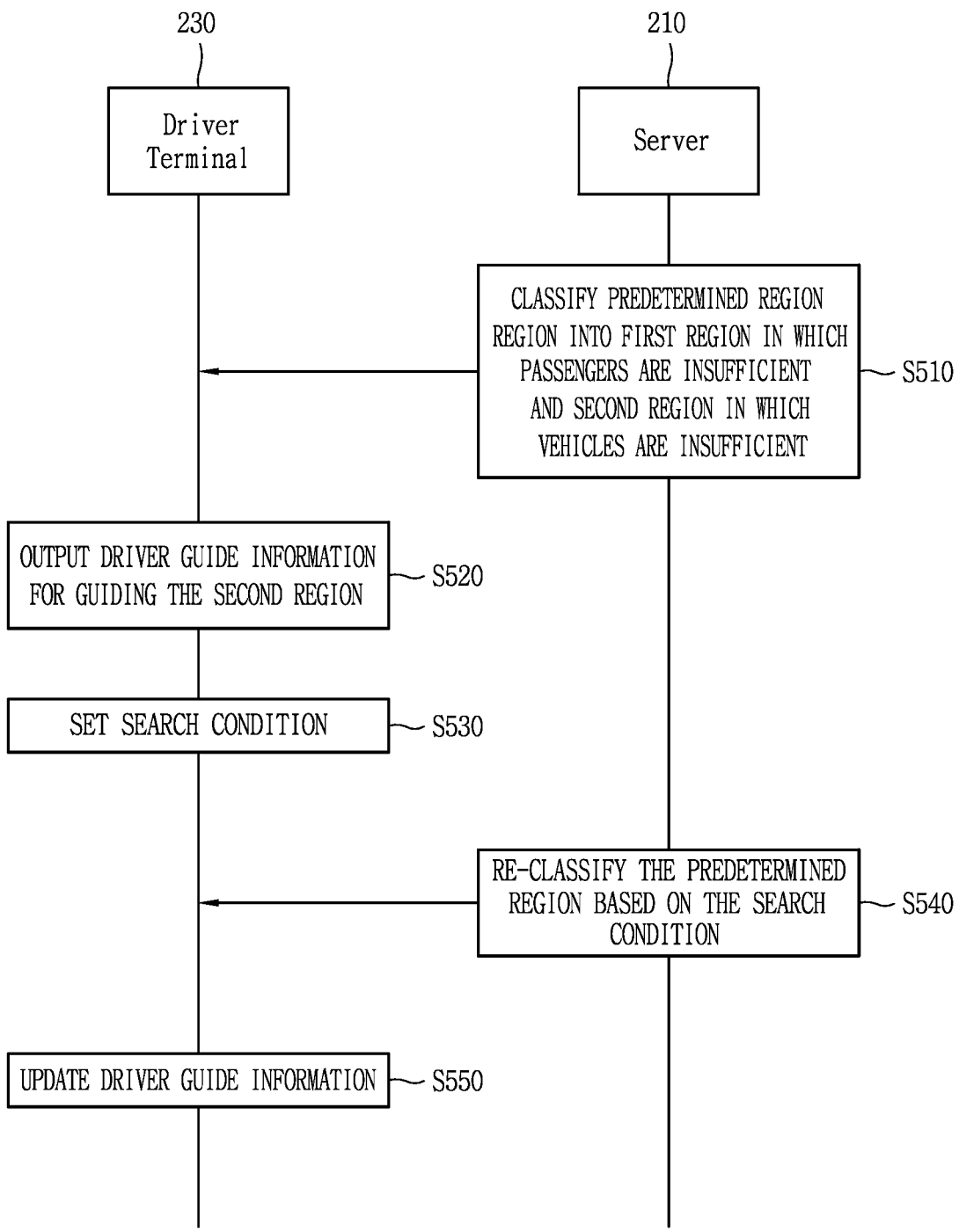
FIG. 5 is a flowchart illustrating a control method of providing a new type of user interface in providing a transportation service through a driver terminal.
Figure 6:
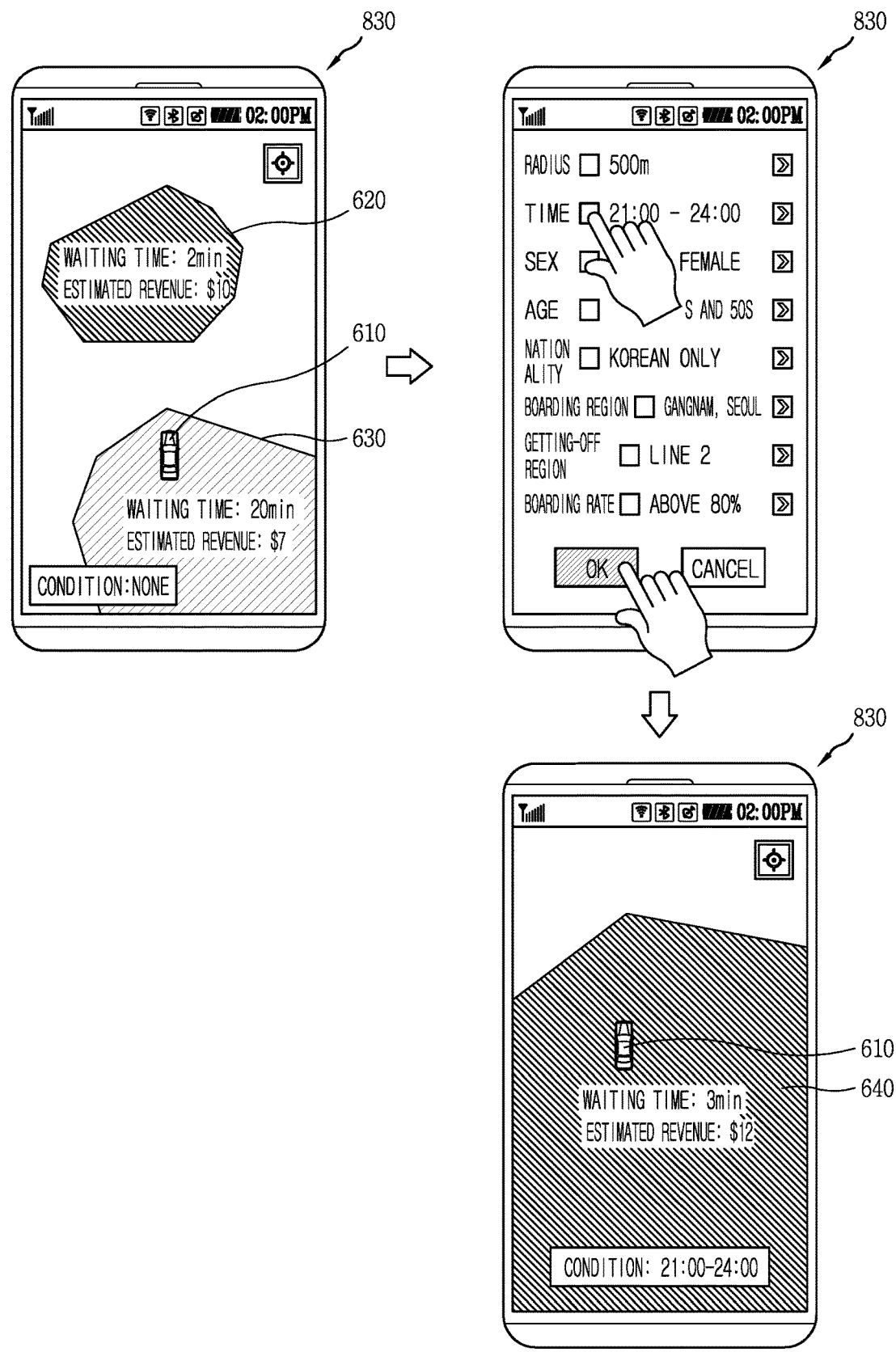
FIGS. 6 and 7 are exemplary views for explaining the control method of FIG. 5.
Figure 7:
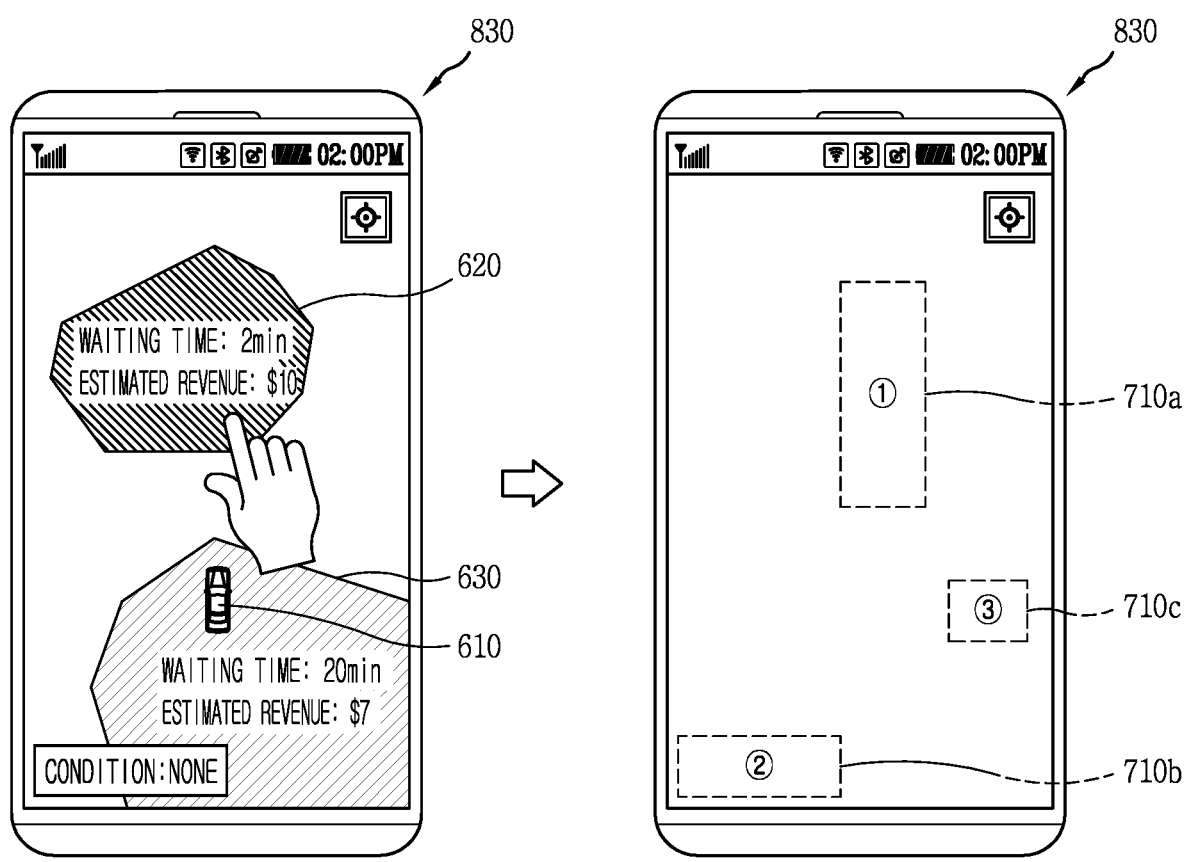

FIG. 5 is a flowchart for explaining a control method of providing a new type of user interface in providing a transportation service through a driver terminal, and FIGS. 6 and 7 are exemplary views for explaining the control method of FIG. 5.

First, the server 210 may divide a predetermined region into a first region in which passengers are insufficient and a second region in which vehicles are insufficient based on information received at the server 210 (S510).

The information received at the server 210 is information received from at least one terminal included in the transportation system 200.

The information received at the server 210 is collected, stored, processed and analyzed in real time. According to the information received at the server 210, a predetermined region is divided into a plurality of regions, and statistical data for each region is generated for each unit time period. The statistical data includes a number of passengers making a vehicle request, a number of vehicles waiting for a reservation request, a type of destination desired by a passenger, and a type of fare generated, based on a specific region at a specific time.

For an example, when passengers execute a passenger application, a number of passengers may be calculated using a number of executions. Alternatively, a number of passengers may be calculated using a number of vehicle requests received from client terminals.

For another example, a number of driver terminals executing a driver application being executed may be calculated to calculate a number of vehicles to provide transportation services.

Moreover, the server 210 may generate forecast data for the future based on the statistical data, and provide a transportation service based on at least one of the statistical data and the forecast data.

The predetermined region may be divided into a first region and a second region. The predetermined region may include one or more first regions, and may include one or more second regions. The predetermined region may also include a third region that is neither the first region nor the second region.

The first region may be defined as a region where a number of passengers is less than a number of vehicles by a first reference. For example, if the first reference is set to 100, then the relevant region is classified as a first region when a number of passengers is 50 in case where a number of vehicles is 200. The first region denotes a region having more vehicles than passengers, and corresponds to a region where vehicle exiting is required. The first reference may be modified in various ways.

The second region may be defined as a region where a number of vehicles is less than a number of passengers by a second reference. The second reference may be different from the first reference, and modified in various ways according to the embodiment. For example, if the second reference is set to 50, then the relevant region is classified as a second region when a number of vehicles is 30 in case where a number of passengers is 100. In other words, the second region denotes a region having more passengers than vehicles, and corresponds to a region where vehicle entering is required.

The predetermined region may also include a third region that is neither the first region nor the second region.

On the other hand, the predetermined region may vary depending on a point where the driver terminal is located. The server 210 may specify a predetermined region based on the location of the driver terminal 230, and transmit only information on the specified predetermined region to the driver terminal 230. It is because much time and money are consumed when information of all the regions managed by the server 210 is transmitted.

The predetermined region may vary depending on a request of the driver terminal. For example, the center point of a map image may be changed or the scale of a map image may be changed according to a user input applied to the map image of the driver terminal 230. Due to physical size limitation of the display unit, the entire map image may not be displayed, and thus a region to be displayed may vary depending on the user input. In this case, the predetermined to region may be defined as a region displayed on the display unit.

Moreover, a first region and a second region of the predetermined region may vary depending on the driver terminal. It is because different passenger conditions are set for different driver terminals, and passengers matched according to the set passenger conditions are different.

The first region and the second region may vary depending on the passenger condition. Specifically, the first region may be a region in which a number of passengers matching a passenger condition of the driver terminal is less than the first reference value, and the second region is a region in which a number of passengers matching a passenger condition of the driver terminal is greater than the second reference value, contrary to the first region.

The server 210 transmits information on at least one of the first region and the second region to the driver terminal 230. The predetermined region and a first region and a second region included in the predetermined region are different according to the driver terminal 230. For example, when a first driver terminal is located in Seoul, Korea, the predetermined region may be set to Seoul, and when a second driver terminal is located in New York, the predetermined region may be set to New York.

Next, the driver terminal 230 displays driver guide information for guiding the second region (S520). When the driver terminal 230 is located in the first region, the driver guide information may be output in at least one of visual, auditory, and tactile modes.

The driver guide information denotes information for guiding at least one of the first region and the second region.

For example, as illustrated in FIG. 6, the driver terminal 230 may display a map image including a point where the driver terminal 230 is located on the display of the driver terminal 230. Furthermore, the driver terminal 230 may display a second region graphic object 620 for guiding the second region on the map image. A current position graphic object 610 for guiding a current location of the driver terminal 230 and a first region graphic object 630 for guiding a first region may be further displayed on the map image.

The first region graphic object 630 and the second region graphic object 620 may be images having different colors. The image may be made transparent so that a map image located below is visible. The visibility of the first region and the second region is provided by these graphic objects.

First expected revenue in the first region and second expected revenue in the second region may be displayed on the map image. Furthermore, an estimated time period required to receive a reservation request in each region may be displayed on the map image.

Expected revenue may refer to sales that can occur when waiting in the relevant region, and may be expressed as revenue per unit of time. For example, in case where the driver is able to receive a reservation request corresponding to an average 140 dollars when he or she waits 20 minutes in the first region, the waiting time may be 20 minutes and the expected revenue may be calculated as 7 dollars per minute. On the contrary, in case where the driver is able to receive a reservation request corresponding to an average 20 dollars when he or she waits 2 minutes in the first region, the waiting time may be 2 minutes and the expected revenue may be calculated as 10 dollars per minute. The expected revenue may be calculated in various ways according to various algorithms.

On the other hand, the driver guide information may be route guide information having one point of the second region as a destination of the driver terminal 230. The one point may be a point at which the vehicle is able to park within the second region. In this case, the driver may move to a point suggested by the driver terminal without having to search for a point where the revenue is maximized, thereby maximizing the convenience of the driver. In addition, since the vehicle may park at the one point to wait, thereby minimizing fuel consumption due to the movement of the vehicle.

The driver guide information may be displayed when there is a request from a user or automatically displayed when a preset condition is satisfied.

On the other hand, the driver may set a search condition using his/her own driver terminal, and receive information on the first region and the second region corresponding to the set search condition.

The driver terminal 230 may set a search condition based on a user input (S530). The search condition may be set for each time zone, for each passenger condition, for each region, and for each expected revenue, and the set search condition is transmitted to the server 210.

The driver terminal 230 may provide a user interface for setting a search condition. A search condition setting screen capable of setting at least one search condition item may be displayed on the display of the driver terminal 230. The driver terminal 230 may receive a search condition and transmits the search condition to the server 210 based on a user input applied to the search condition setting screen.

The server 210 reclassifies the predetermined region based on the search condition, and transmits the reclassified information to the driver terminal 230 (S540). Then, the driver terminal 230 may update the driver guide information based on information received from the server 210 (S550). In other words, at least one of the first region and the second region is changed according to a search condition.

For example, as illustrated in FIG. 6, the driver terminal 230 may display driver guide information for guiding the second region 620 based on the current time of 14 o'clock. Then, when a predetermined time zone (21:00-24:00) is received from the user as a search condition and transmitted to the server 210, the server 210 reclassifies the first region and the second region based on the predetermined time period. The driver terminal 230 may update the driver guide information being displayed based on information received from the server 210. Accordingly, the existing graphic objects 620, 630 disappear, and a graphic 640 for guiding a new second region may be displayed on the map image.

When a touch is applied to the second region graphic object 620, the driver terminal 830 may display detailed information on the second region on the display of the driver terminal 830. For example, as illustrated in FIG. 7, the detailed information may include parking region guide graphic objects 710*a*-710*c* for guiding a region in which the vehicle is able to park in the second region. The driver may identify a region where parking is allowed within the second region, and move to the region.

A transportation system according to the present disclosure may guide a passenger crowded region or a no passenger region for a certain area in the vicinity from a point where the driver is located, and guide the driver to a region where the revenue is maximized. Through this, the driver may visually confirm at which point and at which time zone there is a large number of passengers. Furthermore, a plurality of vehicles may be efficiently deployed by big data.

Figure 8:
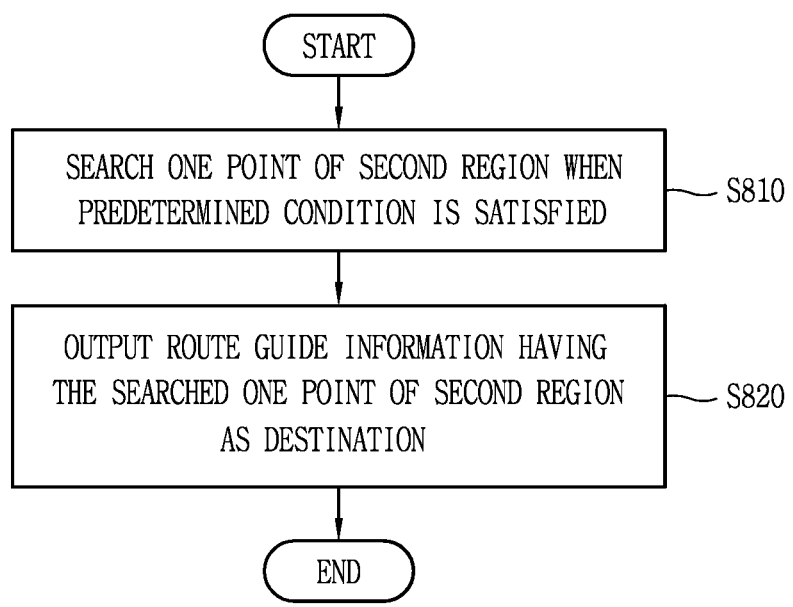
FIG. 8 is a flowchart for explaining one step of FIG. 5 in more detail.
Figure 9:
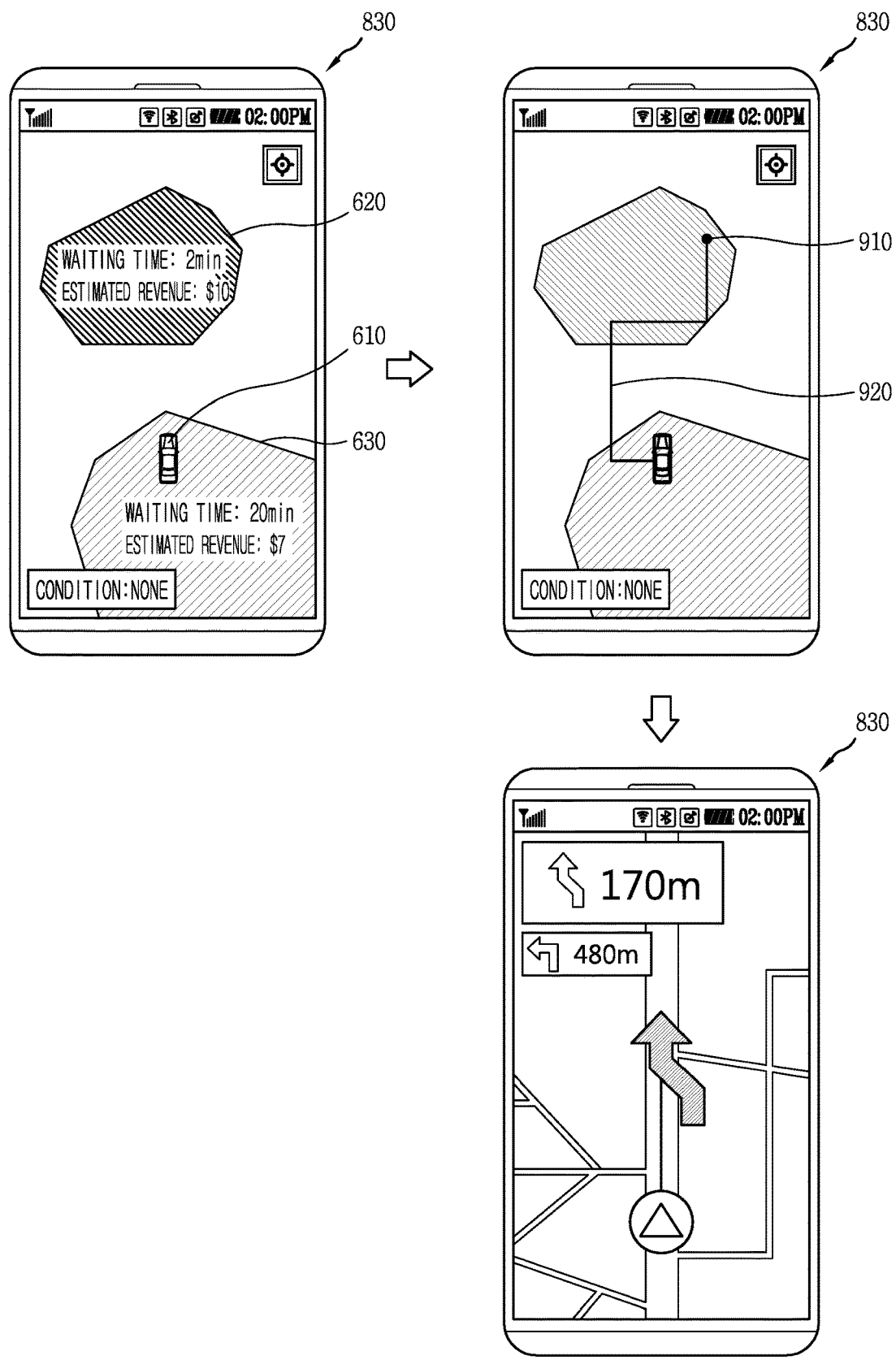
FIG. 9 is an exemplary view for explaining the example.

FIG. 8 is a flowchart for explaining one step of FIG. 5 in more detail, and FIG. 9 is an exemplary view for explaining the example;

The process of displaying driver guide information in FIG. 5 may be embodied as processes illustrated in FIG. 8.

When a predetermined condition is satisfied, the server 210 or the driver terminal 220 may search for one point of the second region (S810).

For an example, the server 210 may determine whether the driver terminal 230 satisfies the predetermined condition, and transmit an output command of the driver guide information to the driver terminal 230 as a result of the determination. The server 210 may transmit an output command to driver terminals in some vehicles so that the some vehicle located in the first region (vehicles>guests) move to the second region (vehicles<guests). The driver terminal 230 may output the driver guide information in response to the output command.

For another example, it may be determined whether the driver terminal 230 other than the server 210 satisfies the preset condition to output the driver guide information according to the determination result.

The preset condition denotes a case where the vehicle needs to move from the first region to the second region. For example, the driver guide information may be output when the driver terminal is located in the first region and the reservation request is not transmitted to the driver terminal for a reference time period. For another example, when the second region is located within a reference distance and the driver terminal is located at a position other than the second region, the driver guide information may be output. The preset condition may be modified in various ways according to the embodiment.

For example, one point of the second region may be a point with a minimum waiting time for waiting for a reservation request. For still another example, one point of the second region may be defined as a point at which the vehicle is able to park in the second region. It is because when the vehicle continues to move, the resources are consumed accordingly. As a result, one point where the vehicle is able to park while being able to quickly receive a reservation request is searched by the server 210 or the driver terminal 230.

Next, the driver terminal 230 may output route guide information having the searched one point of the second region as a destination (S820). For example, as illustrated in FIG. 9, the driver terminal 230 may output driver guide information for guiding the second region 620. Then, when a reservation request is not transmitted to the driver terminal 230 for a predetermined time period, the driver terminal 230 may output the route guide information 920 having one point 910 of the second region as a destination.

Simple information guiding the second region or route information directing one point of the second region is outputted according to the driver's situation, thereby increasing the convenience of the driver and maximizing the revenue.

On the other hand, when there is no vehicle within a predetermined range from the position of the client terminal 210, the passenger is informed that there is no vehicle. The transportation system according to the present disclosure may provide an alternative transportation means through which a passenger is able to move to a destination when there is no vehicle.

Figure 10:
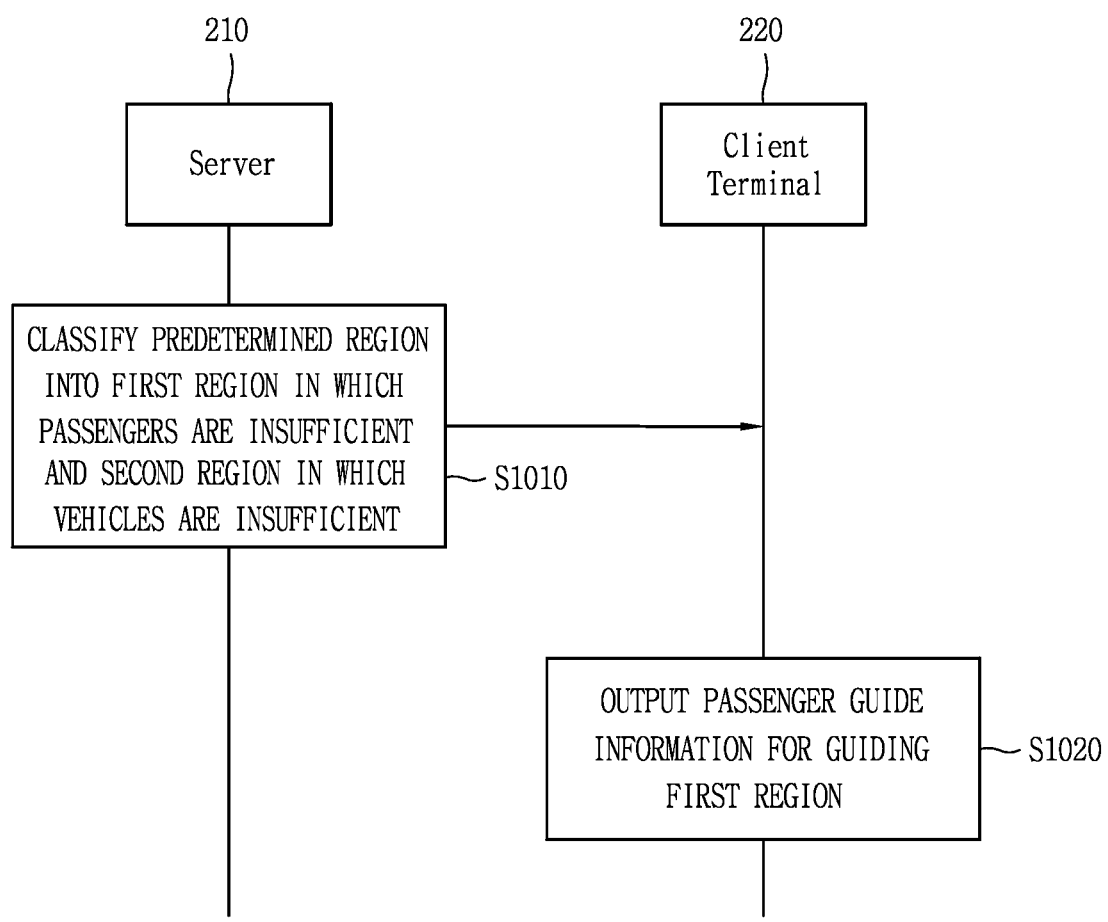
FIG. 10 is a flowchart illustrating a control method of providing a new type of user interface to a passenger in providing a transportation service through a client terminal.
Figure 11:
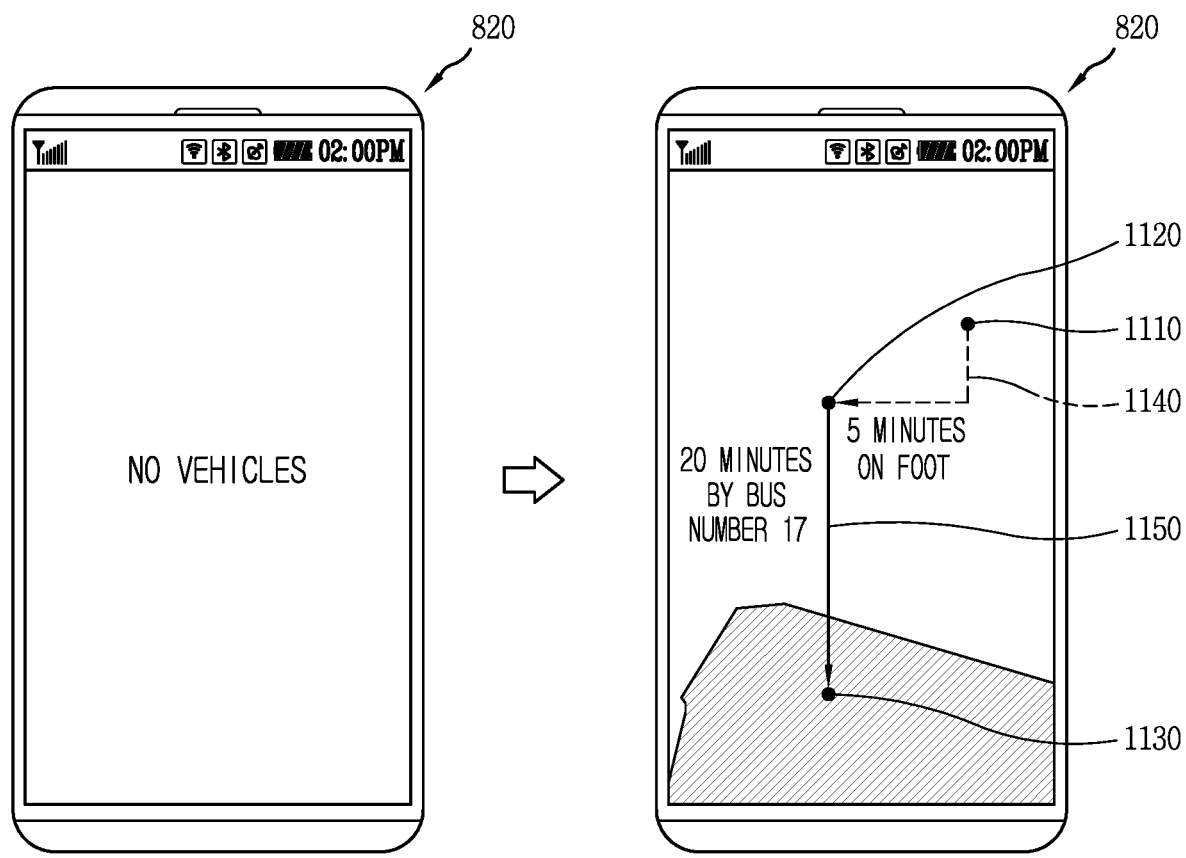
FIG. 11 are exemplary views for explaining the control method of FIG. 10.

FIG. 10 is a flowchart for explaining a control method of providing a new type of user interface in providing a transportation service through a driver terminal, and FIGS. 6 and 11 are exemplary views for explaining the control method of FIG. 10.

The server 210 may divide a predetermined region into a first region in which passengers are insufficient and a second region in which vehicles are insufficient (S1010). The method of dividing a predetermined region has been described with reference to FIG. 5, and thus it will be omitted.

Information on the predetermined region is transmitted not only to the driver terminal 230 but also to the client terminal 220. The predetermined region varies depending on the location of a terminal receiving the information, more specifically, the location of a terminal receiving the information and a user input entered to the terminal receiving the information.

Next, the client terminal 220 displays passenger guide information for guiding the first region (S1020). Specifically, the client terminal 220 displays a map image including a point where the client terminal 220 is located on the display of the client terminal 220. The client terminal 220 displays a first region graphic object for guiding the first region on the map image. Furthermore, the client terminal 220 may further display a second region graphic object for guiding the second region on the map image. Accordingly, it may be possible to provide visibility for the first and second regions for the passenger, and allow the passenger to visually confirm a region to which the vehicle can be assigned and select a movement method.

On the other hand, the passenger guide information may be route guide information having one point of the first region as a destination of the client terminal 220. It is to suggest a movement so that the passenger can be assigned to the vehicle.

The server 210 or the client terminal 220 may search for other transportation means for moving to one point of the first region, and the client terminal 220 may guide the searched transportation means.

For example, as illustrated in FIG. 11, when there is no vehicle that responds to a vehicle request of the client terminal 210, the server 210 notifies the client terminal 220 that there is no vehicle. The client terminal 220 may guide that there is no vehicle, and output route guide information having one point of the first region as a destination.

The route guide information is information indicating a current position of the client terminal 210 as a departure point 1100 and a point of the first region as a destination point 1130. When it is required to use another transportation means to the destination point 1130, the client terminal 210 may guide a waypoint 1120 that should use the another transportation means, and output the detailed information of the transportation means that should be used. For example, a first route 1140 that should move by walk from a departure point 1110 to a waypoint 1120 and a second route 1150 that should move from the waypoint 1120 to a departure point 1130 may be displayed on the display of the client terminal 220.

Meanwhile, the transportation system according to the present disclosure may provide a new type of service that provides convenience to the driver and the passenger in a process from a reservation to a contact.

Figure 12:
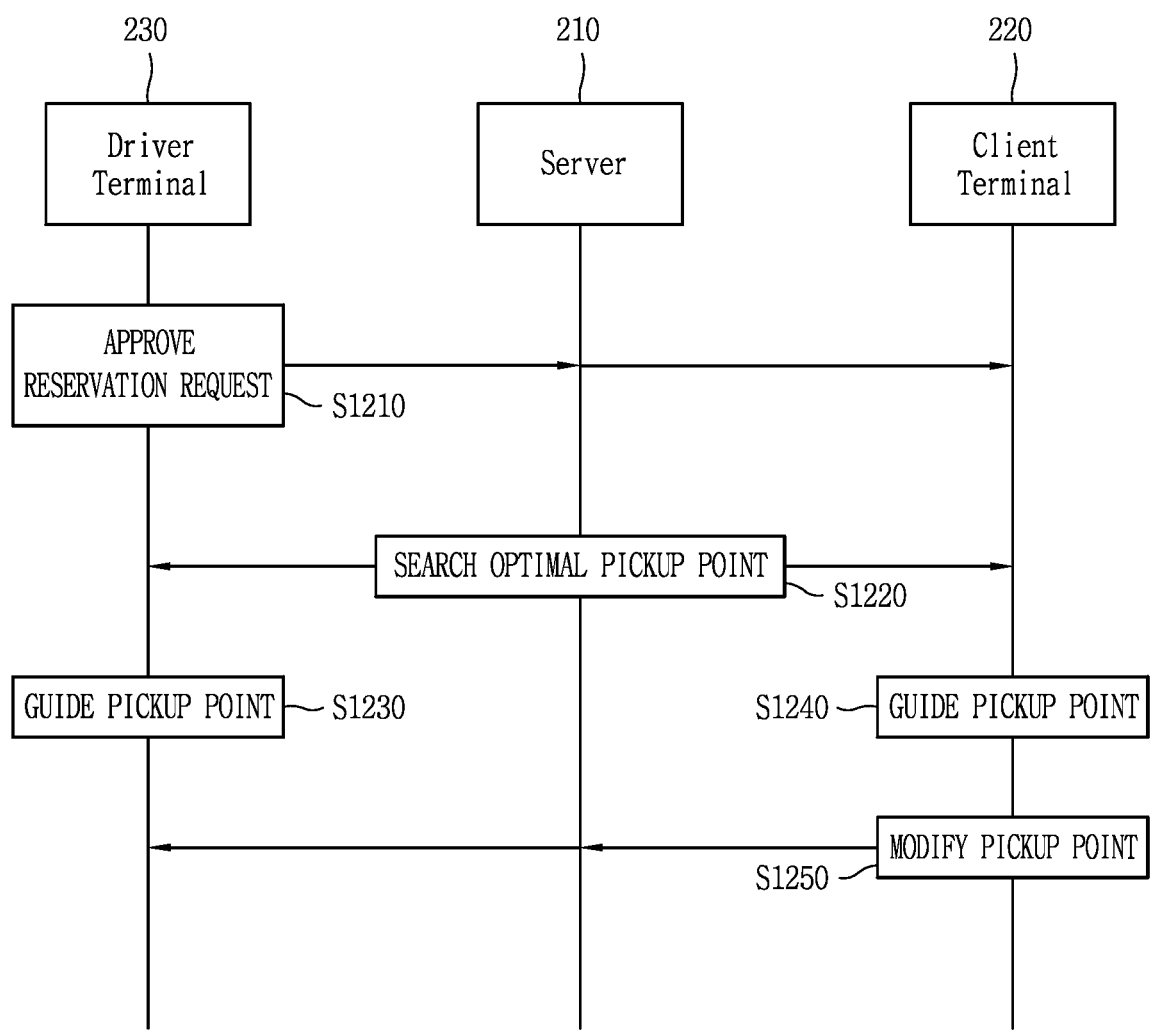
FIG. 12 is a flowchart for explaining a method of arranging a meeting of drivers with passengers, as an example of a control method carried out by the transportation system of FIG. 2.
Figure 13:
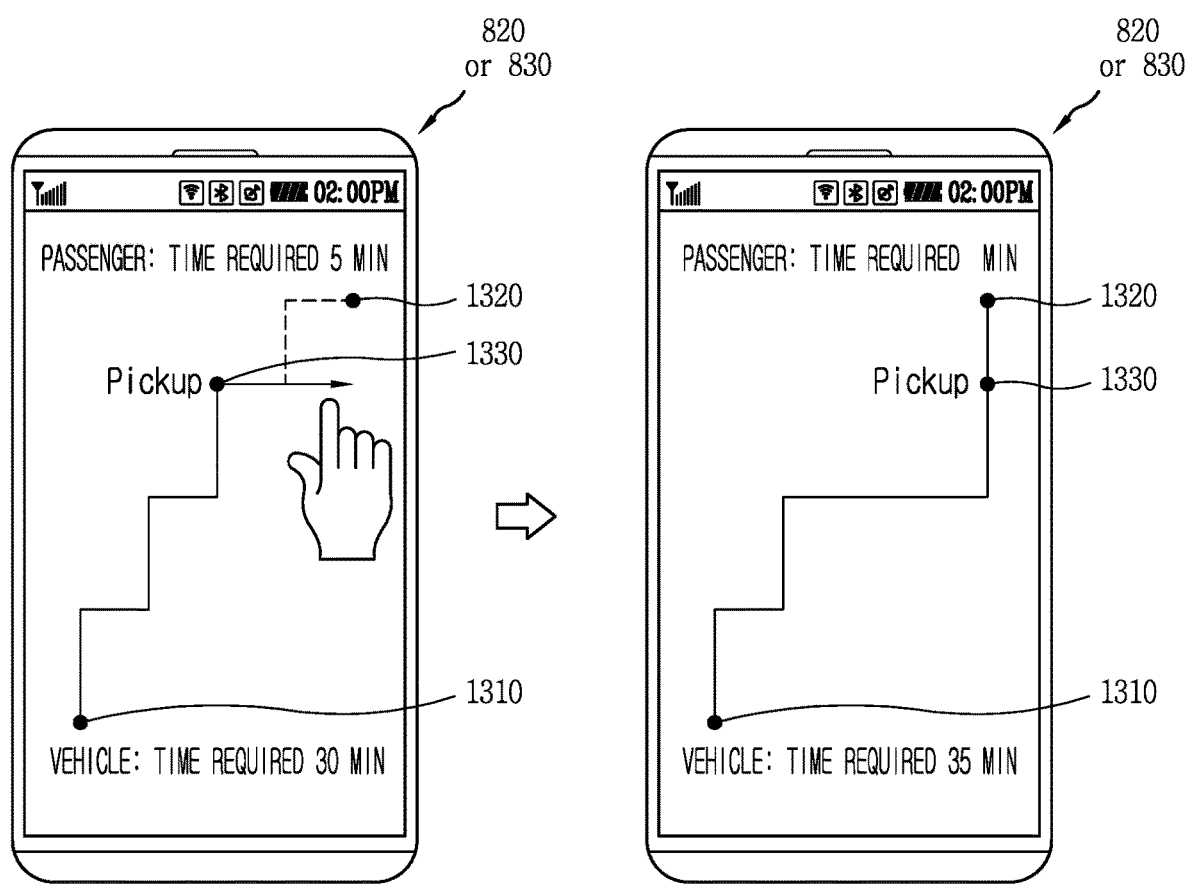
FIG. 13 is an exemplary view of a client terminal or a driver terminal implementing the method of FIG. 12.

FIG. 12 is a flowchart for explaining a method of arranging a meeting between a driver and a passenger as an example of a control method carried out by the transportation system of FIG. 2, and FIG. 13 is an exemplary view illustrating a client terminal or a driver terminal for implementing the method of FIG. 12.

A reservation request approval may be transmitted from the driver terminal 230 that has received a reservation request to the server 210 (S230). In this case, the server 210 mediates between the driver terminal 230 and the client terminal 220, and searches for an optimal pickup point in consideration of the location of the driver terminal 230 and the location of the client terminal 220 (S1220).

The optimal pickup point may be a point where the vehicle can be parked so that the passenger can board the vehicle, and a point where the passengers movement is minimized. According to the law, a point that cannot be parked will be excluded from the pickup point.

The searched pickup point is transmitted to the client terminal 220 and the driver terminal 230, and the client terminal 220 and the driver terminal 230 respectively guide the pickup point using their own displays (S1230, S1240).

The driver terminal 230 may start route guide to the departure point of the vehicle request, and the client terminal 220 may receive driver information from the server 210 to display the received driver information on the display of the client terminal 220.

The pickup point may be changed in real time as the location of the client terminal 220 is changed. It is to minimize the movement of the passenger, and when the passenger moves in a direction opposite to the pickup point, a new pickup point may be searched in consideration of the movement. When the pickup point is re-searched, the re-searched pickup point is transmitted to the client terminal 220 and the driver terminal 230 in real time.

The server 210 may change the pickup point based on the location of the client terminal 220, the location of the driver terminal 230 and the volume of traffic, and transmit the changed pickup point to the client terminal 220 and the driver terminal 230.

Furthermore, the pickup point may be modified at the request of the passenger or the driver (S1250). For example, as illustrated in FIG. 13, a map image may be displayed on the client terminal 220 or the driver terminal 230, and the current location 1310 of the driver terminal and the current location 1320 of the client terminal may be guided by a graphic object. In addition, a pickup point 1330 where the driver contacts with the passenger may also be guided by a graphic object.

When the pickup point 1330 moves from a first point to a second point by a drag input, the pickup point 1330 is corrected to a position corresponding to the second point. Through this, the passenger or driver may change his or her pickup point. As the pickup point is changed, a time period required for the vehicle to reach the pickup point, a travel path of the vehicle, and a travel path of the passenger may be changed.

Moreover, the client terminal 220 or the driver terminal 230 may guide at least one of a selectable region that can be selected as a pickup point and a non-selectable region that cannot be selected as a pickup point. Specifically, a map image may be displayed, and at least one of a selectable graphic object for guiding the selectable region and a non-selectable graphic object for guiding the non-selectable region may be displayed on the map image. It allows the passenger to modify the pickup point within the selectable region.

The non-selectable region denotes a region where parking of the vehicle is not permitted by the law like a bus stop. A region that requires more time than the reference to move to the pickup point due to heavy traffic may also be included in the non-selectable region.

On the other hand, when the driver moves to the pickup point, there is a problem that a third party who is not reserved boards the vehicle due to a large number of people at the pickup point. The driver is required to allow boarding only for reserved passengers, and the transportation system according to the present disclosure provides an authentication mean to the passenger and the driver.

Figure 14:
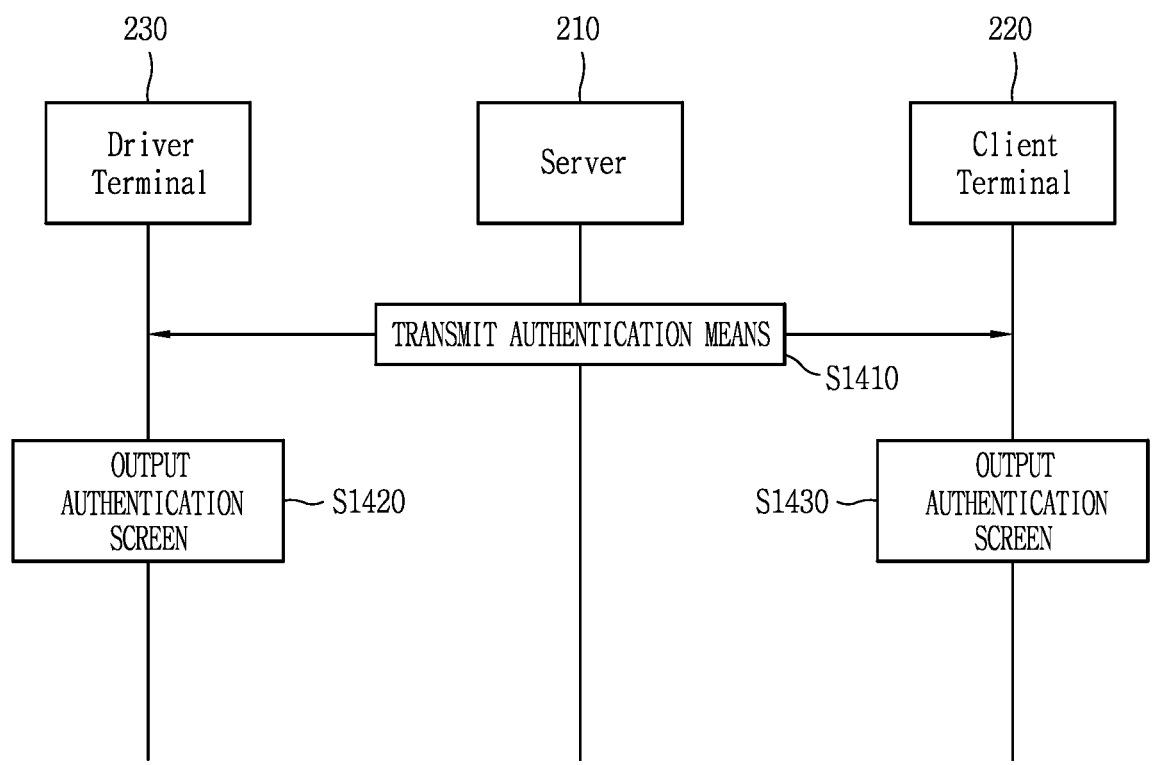
FIG. 14 is a flowchart for explaining a method of allowing a driver to easily confirming his or her passengers, as an example of a control method carried out by the transportation system of FIG. 2.
Figure 15:
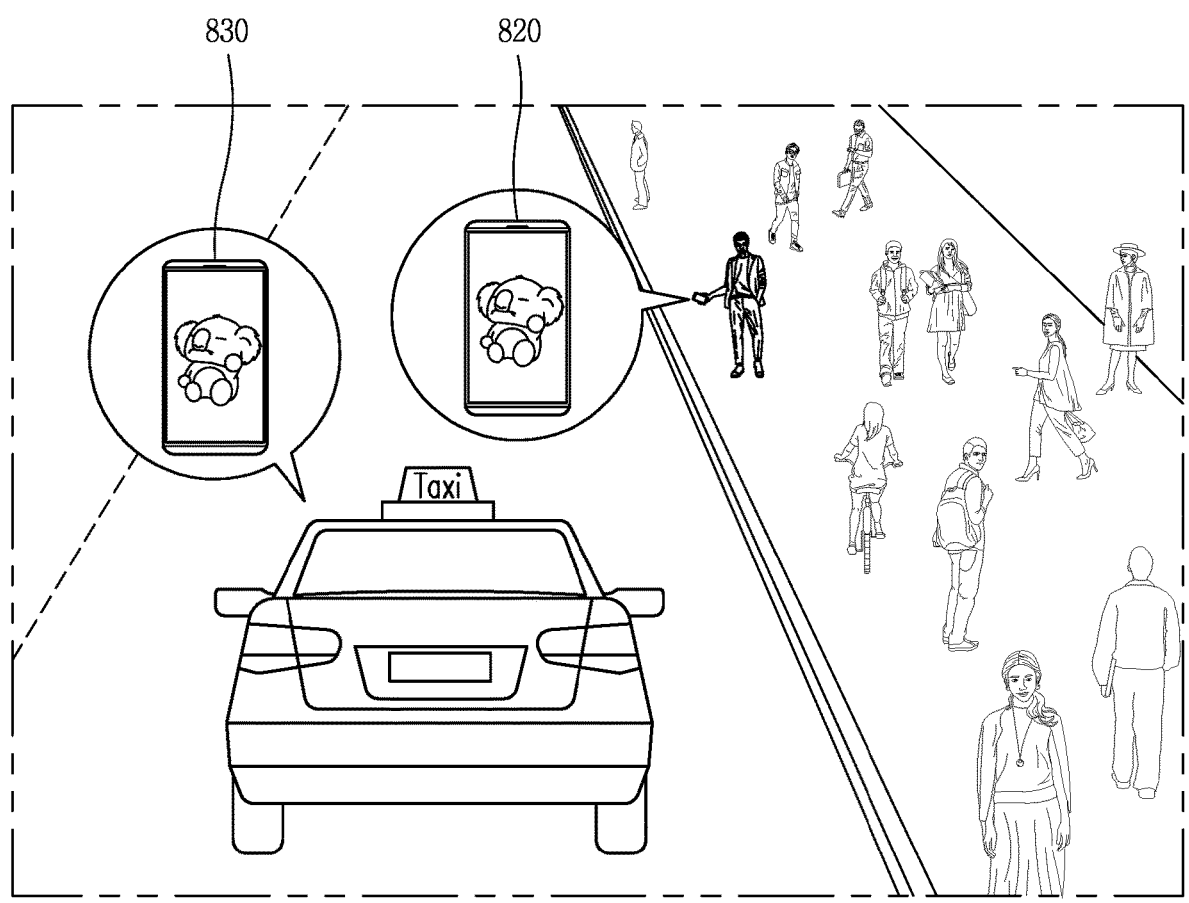
FIG. 15 are exemplary views for explaining the method of FIG. 14.

FIG. 14 is a flowchart for explaining a method of allowing a driver to easily confirming his or her passengers, as an example of a control method carried out by the transportation system of FIG. 2, and FIG. 15 is an exemplary view for explaining the method of FIG. 14.

Referring to FIG. 14, the server 210 transmits an authentication means to the client terminal 220 and the driver terminal 230 (S1410). The authentication means denotes a means for allowing the passenger to authenticate himself or herself as a reserved passenger.

The client terminal 220 and the driver terminal 230 respectively output an authentication screen associated with the authentication means (S1420, S1430).

For example, the authentication means may be an electronic key capable of unlocking a door of a vehicle connected to the driver terminal 230. When the driver parks the vehicle at the pickup point, the passenger may open the door of the vehicle using his or her client terminal 220 that has received the authentication means. When the client terminal 220 is tagged to the vehicle, the door of the vehicle can be opened. A passenger who does not have the authentication means cannot open the door of the vehicle, so that a problem that a third party who is not reserved is boarded on the vehicle is blocked in advance.

For another example, as illustrated in FIG. 15, the authentication means may be a unique image transmitted by the server 210. The client terminal 220 or the driver terminal 230 may display an authentication screen configured to allow the driver to identify the passenger on the display when the driver terminal and the client terminal are located within a predetermined range. When the passenger holds the display of the client terminal 220 to face the road, the driver boarding the vehicle may confirm the authentication screen displayed on the display of the driver terminal 230, and search for the client terminal 220 on which the same authentication screen is displayed. As a result, the driver may easily confirm the reserved passenger.

For still another example, the driver terminal 230 may be connected to a vehicle to control various electrical components provided in the vehicle. When the driver terminal 230 arrives within a predetermined distance from the pickup point, the driver terminal 230 may receive an image from a camera provided in the vehicle to capture an outside of the vehicle, and search for the passenger from the received image. Specifically, the driver terminal 230 may receive a passenger image from the server 210, and compare the received passenger image with an image captured by the camera to search for the passenger. When the passenger is searched, the driver terminal 230 may guide the position of the searched passenger using the captured image. When the passenger is located within an error range of the GPS, the driver terminal 230 may quickly search for the reserved passenger through the camera provided in the vehicle.

On the other hand, when the driver terminal 230 arrives within a predetermined distance from the pickup point, the driver terminal 230 may display the name or nickname of the passenger reserved using a display device provided in the vehicle. The passenger may confirm his or her vehicle using information displayed on the display device.

When the passenger boards the vehicle, the passenger may change the destination of the vehicle using the client terminal 220. For example, a preset first destination may be changed to a second destination using the client terminal 220. The modified second destination is transmitted to the driver terminal 230 through the server 210, and the driver terminal 230 may output route guide information to the changed second destination. The passenger will be able to change his or her destination without having to speak directly with the driver.

Once the passenger has boarded the vehicle, the client terminal 220 may be used as a tool for evaluating the driver.

Figure 16:
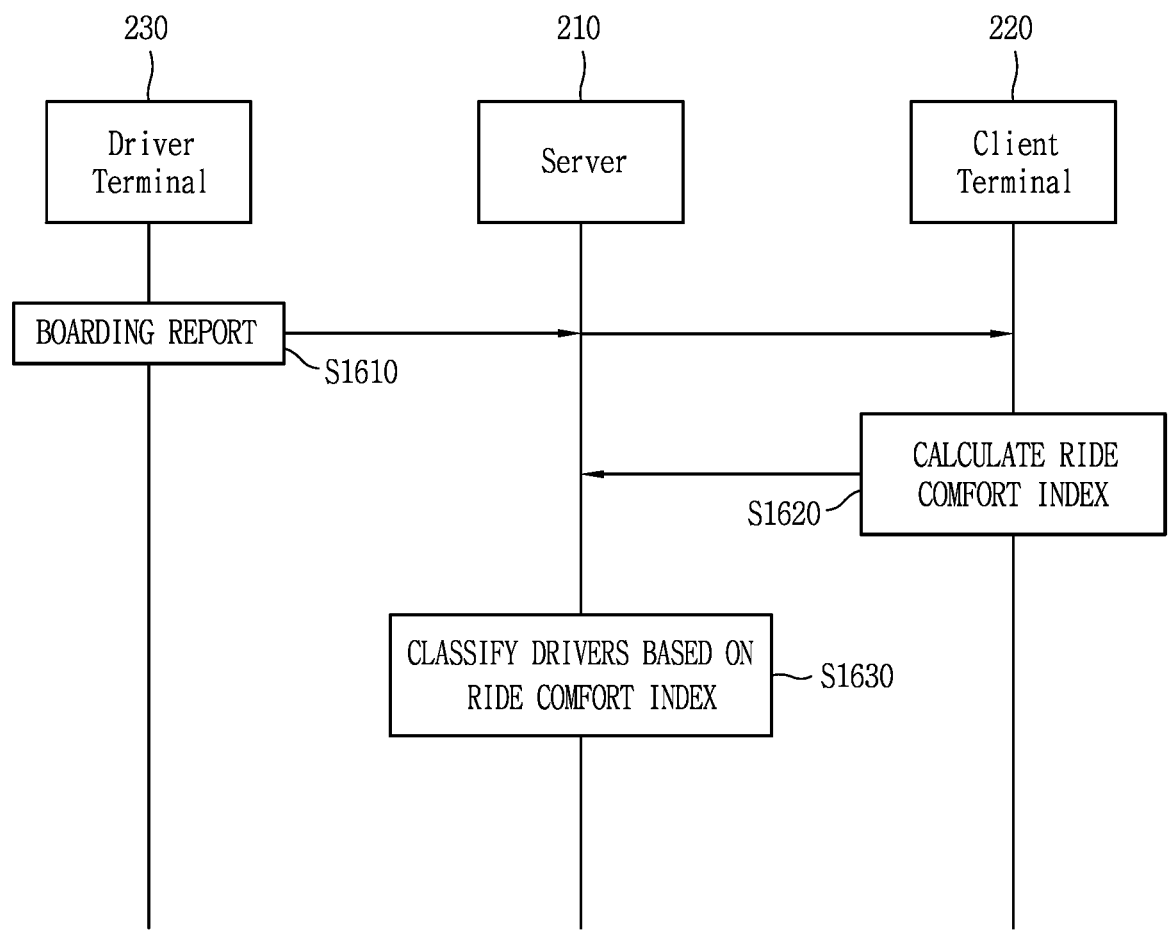
FIG. 16 is a flowchart for explaining a method of obtaining objective data to evaluate drivers using a client terminal, as an example of a control method carried out by the transportation system of FIG. 2.

FIG. 16 is a flowchart for explaining a method of obtaining objective data to evaluate drivers using a client terminal, as an example of a control method carried out by the transportation system of FIG. 2;

When the passenger boards the vehicle, the driver terminal 230 transmits a board report to the server 210 (S1610). The fare is calculated from the time when the board report is transmitted, and the board report may be transmitted to the client terminal 220 through the server 210.

The client terminal 220 calculates a ride comfort index using various sensors provided in the terminal (S1620), and transmits the ride comfort index to the server 210 (S1620).

The ride comfort index may be calculated by at least one of speed, acceleration, angular velocity, vibration, and centrifugal force of the client terminal 220. Such a ride comfort index may be expressed as a two-dimensional graph in which the time is an x-axis variable and the ride comfort index is a y-axis variable, and displayed on the client terminal 220 or the driver terminal 230.

On the other hand, the ride comfort index may be calculated in different ways according to a travel path to the destination point. For example, it may be calculated according to a first reference in a straight section, and calculated according to a second reference in a curved section. In the curved section, a centrifugal force and an angular velocity operate at a higher level than in the straight section, and thus the second reference may be a relaxed reference than the first reference.

Moreover, the client terminal 220 may start voice recording and/or video recording when noise is generated higher than the reference while moving to the destination. The generated audio or video file may be transmitted to the server 210 and used as data for evaluating the driver.

Since the client terminal 220 uses information sensed by a sensor provided in the client terminal 220 and calculates a riding comfort index in different ways according to the travel path of the vehicle, objective data for evaluating the driver may be generated.

The server 210 may classify the driver or the driver terminal 230 into one of a plurality of groups based on the ride comfort index received from the client terminal 220. Any one of the groups may be an exemplary driver group and another one may be a bad driver group. For a driver included in the exemplary driver group, the fee may be discounted or the driver may be recommended to the client terminal as an exemplary driver. On the contrary, the bad driver group may be dismissed or penalized for a fee or the like according to the evaluation of passengers.

Meanwhile, at least one of the client terminal 210 and the driver terminal 230 according to the present disclosure may generate a carsharing schedule, and perform various functions for carsharing based on a user input.

Figure 17A:
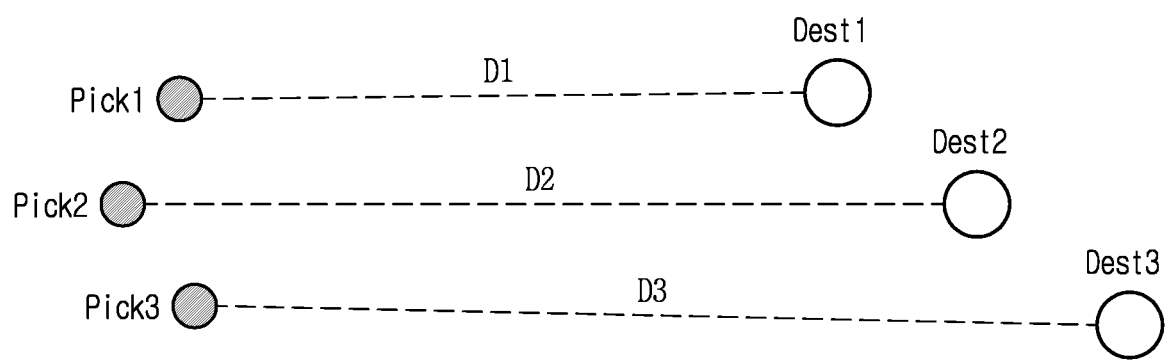
FIGS. 17A and 17B are conceptual views for explaining a shared economy using a transportation service.
Figure 17B:
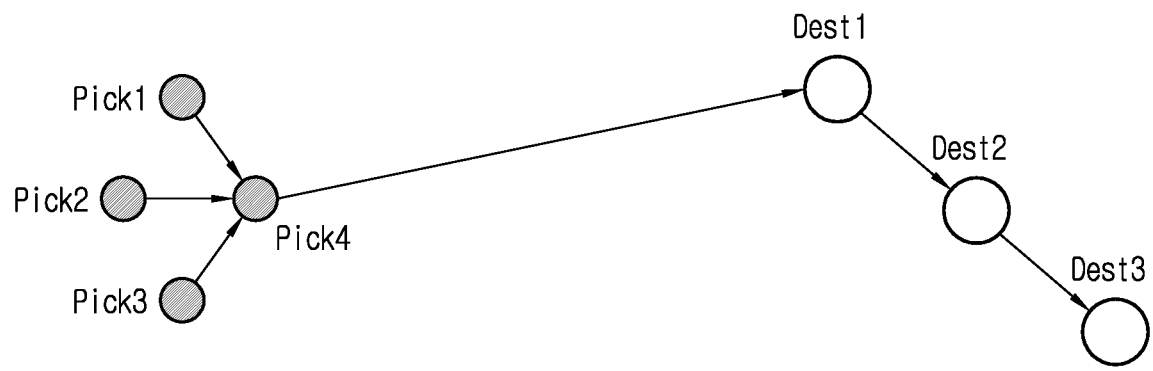

FIGS. 17A and 17B are conceptual views for explaining a shared economy using a transportation service.

As illustrated in FIG. 17A, a first team through a third team may move from similar departure points (Pick1-Pick3) to similar destination points (Dest1-Dest3) using different vehicles. At this time, costs corresponding to the respective travel distances (D1-D3) may occur.

On the contrary, as illustrated in FIG. 17B, when the first team through the third team gather at the same departure point (Pick4) and ride one vehicle and sequentially move from the first destination point (Dest1) to the third destination point (Dest3), a total amount of travel distance decreases and cost also decreases.

Carsharing is a transportation service in which a plurality of people share a vehicle at the same time, and cost is reduced by sharing. For example, when a passenger arrives at Hawaii airport and needs to travel to a hotel, the passenger may save his or her taxi fare when the passenger use a taxi with someone else rather than by himself or herself. In this manner, it can be defined as carsharing that perfect strangers share the same vehicle to move for a certain period of time.

A carsharing schedule means a carsharing reservation registered in the server 210 by a specific person. For example, a specific person may be a passenger to move to a destination with carsharing, a driver to provide the vehicle or a service manager to provide a carsharing service.

Figure 18:
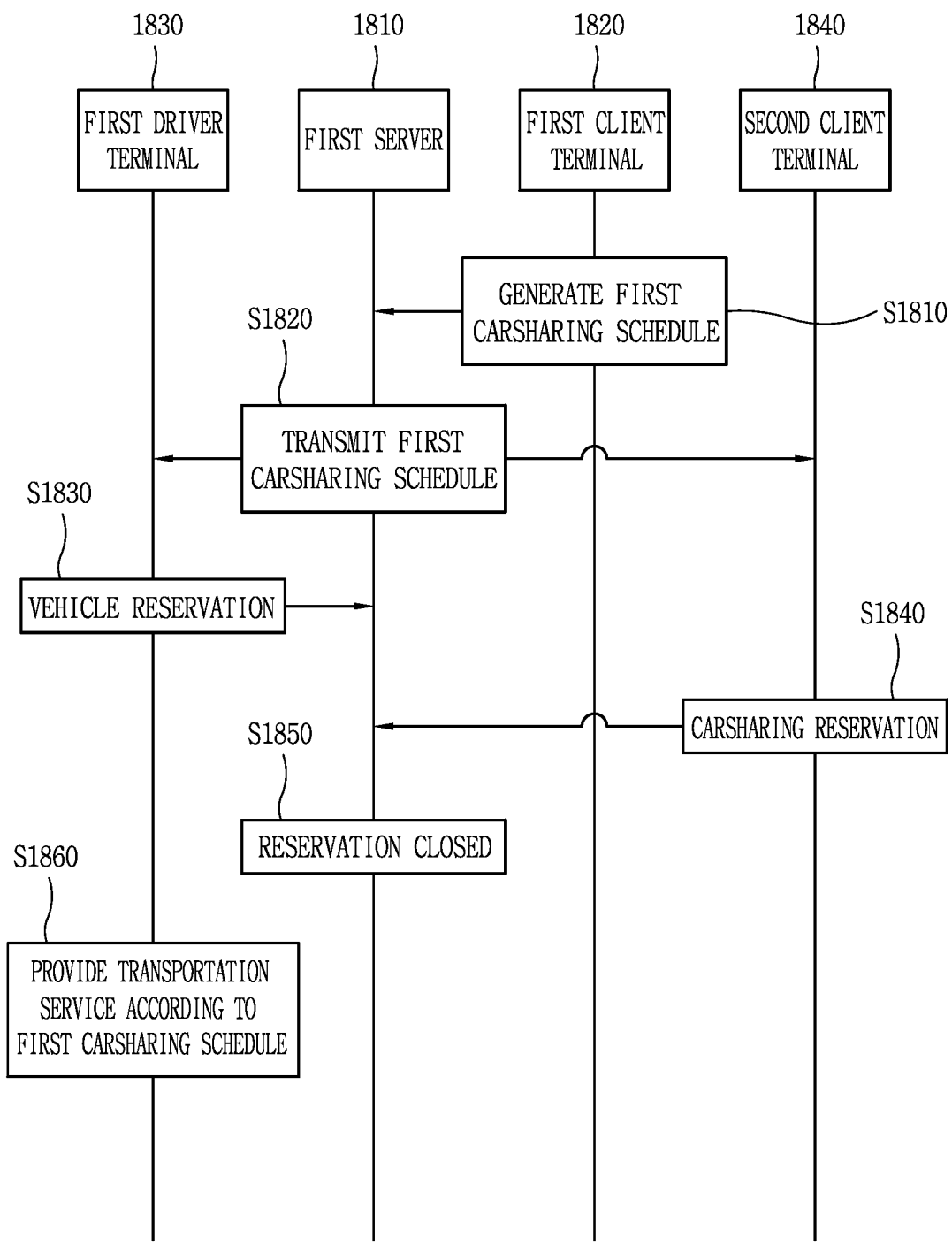
FIG. 18 is a flowchart for explaining a method of allowing a transportation system to provide a carsharing service according to an embodiment of the present disclosure.

FIG. 18 is a flowchart for explaining a method of allowing a transportation system to provide a carsharing service according to an embodiment of the present disclosure.

Referring to FIG. 18, a first client terminal 1820 may generate a first carsharing schedule for a first destination point based on a user input of the first passenger (S1810). The generated first carsharing schedule is transmitted to the first server 1810. The first client terminal 1820 generates a first carsharing schedule including a first departure time, a first departure point and a first destination point.

The first passenger may set at least one of a maximum number of carsharing members and a minimum number of carsharing members using the first client terminal 1820.

The maximum number of carsharing members denotes a maximum number of passengers who will share the vehicle with carsharing. The first server 1810 may open a reservation for a first carsharing schedule to another terminal until a number of carsharing applicants reaches the maximum number of carsharing members. When the number of carsharing applicants who apply for the first sharing schedule reaches the maximum number of carsharing members, the reservation for the first sharing schedule is closed.

Here, "open" denotes a state in which the first carsharing schedule is transmitted to another terminal. When the first carsharing schedule is open, the first carsharing schedule is transmitted to another terminal, and thus the third party may confirm the first carsharing schedule using his or her own terminal, and apply for carsharing on the first carsharing schedule.

On the contrary, "closed" denotes a state in which the first carsharing schedule is not transmitted to another terminal or a state in which transmission is restricted. In other words, "closed" denotes a state in which a carsharing schedule is restricted from being transmitted to another terminal so that a third party cannot apply for carsharing on the carsharing schedule. When the first carsharing schedule is closed, the first carsharing schedule is not transmitted to another terminal, and thus the third party may not confirm the first carsharing schedule, and may not also apply for carsharing.

The minimum number of carsharing members denotes a minimum number of passengers who will share the vehicle with carsharing. The first server 1810 may cancel or confirm the first carsharing schedule based on the minimum number of carsharing members. For example, the first passenger sets two persons as a minimum number of carsharing members, but when a number of carsharing members is one by the time of the reservation deadline, the relevant carsharing schedule is automatically canceled. When cancellation is carried out, the first server 1810 transmits a carsharing cancellation message to the terminal that has requested carsharing. For another example, when the number of carsharing applicants satisfies the minimum number of carsharing members, a reservation is confirmed to start a transportation service.

On the other hand, the first server 1810 may calculate a first estimated fare for the first passenger based on the first departure point and the first destination point, and the first client terminal 1820 may select the first estimated fare. The first passenger may select the type of vehicle to provide a transportation service to the first destination by using the first client terminal 1820, and calculate the first estimated fare in a different manner according to the selected type of vehicle.

Furthermore, the first server 1810 may calculate at least one of an estimated candidate fare and a discount rate according to the number of carsharing applicants. At least one of the calculated estimated candidate fare and the discount rate is transmitted to the terminal that has applied for carsharing on the first carsharing schedule, and the at least one thereof may be displayed on the display of each terminal. For example, when there is one carsharing applicant, a first estimated fare is calculated based on one person. If the maximum number of carsharing members is four, the first estimated candidate fare is calculated based on four persons, and a first discount rate of the first estimated candidate fare for the first estimated fare may be calculated. The user who has applied for carsharing on the first carsharing schedule may compare the first estimated fare with the first estimated candidate fare to check how much is discounted.

Next, the first carsharing schedule is transmitted to at least one client terminal and at least one driver terminal subscribed to the service through the first server 1810 (S1820).

The terminal that has received the first carsharing schedule may output guide information for guiding the first carsharing schedule. For example, when the first driver terminal 1830 receives the first carsharing schedule, the first driver terminal 1830 may display a map image, and display a graphic object for guiding the first departure point on the image. For another example, a pop-up window for guiding the first carsharing schedule may be displayed on the display of the first driver terminal 1830.

The first driver terminal may reserve a vehicle for the first carsharing schedule based on a user input of the first driver (S1830). When the first driver terminal requests the first sharing schedule, a first vehicle registered in the first driver terminal is assigned to a vehicle for providing a transportation service on the first sharing schedule.

The first vehicle and the first passenger must move to the first departure point by the first departure time, and the first passenger moves to the first destination point using the first vehicle.

The second client terminal 1840 may reserve carsharing on the first carsharing schedule based on a user input of the second passenger (S1840). A reservation that includes himself of herself on a carsharing schedule is called a "carsharing application." The second passenger may be provided with the first carsharing schedule through his or her own second client terminal 1840 to determine whether or not to apply for the first sharing schedule. When the second passenger requests carsharing, a second passenger may be added to the first carsharing schedule, and a second destination point of the second passenger may be added thereto. The second passenger may select the first destination point or add a second destination point other than the first destination point. The second passenger may use a transportation service according to the first carsharing schedule only after moving to the first starting point by the first departure time.

As the second passenger is added to the first carsharing schedule, information on the added second passenger is transmitted to the first client terminal 1820 and the first driver terminal 1830 included in the first carsharing schedule. Furthermore, the first server 1810 changes the first estimated fare of the first passenger in response to the addition of the second passenger. It is to reduce the fare of existing passengers as the number of passengers increases.

When the first departure time is reached or the maximum number of carsharing applicants apply for carsharing, the first server 1810 closes reservations for the first carsharing schedule (S1850). In other words, when the first carsharing schedule is closed, the first server 1810 ends the transmission of the first carsharing schedule to other terminals.

The first driver terminal 1830 provides a transportation service according to the first carsharing schedule at the first departure time (S1860).

When the first departure time is reached, the first driver allows the first passenger and the second passenger to board the vehicle to move to either one of the first destination point and the second destination point, and then moves from the either one thereof to another one. At this time, the server calculates an optimal route from the first departure point to the either one and from the either other to the another one, and the first driver terminal guides the calculated optimal route.

If the first passenger has to pay 10 dollars when the first passenger uses a first vehicle alone, then the first passenger may have to pay 7 dollars when he or she uses the first vehicle with the second passenger. As a result, when the use of a vehicle is scheduled for a passenger, he or she may register a carsharing schedule to save the fare. A driver may provide a vehicle to a plurality of teams rather than one team to generate more revenue.

Hereinafter, a method of allowing a terminal included in a transportation system to provide a carsharing service will be described. The operation of a mobile terminal that has received carsharing schedules from the server 210 in a state where a plurality of carsharing schedules are registered in the server 210 will be described in detail.

Figure 19:
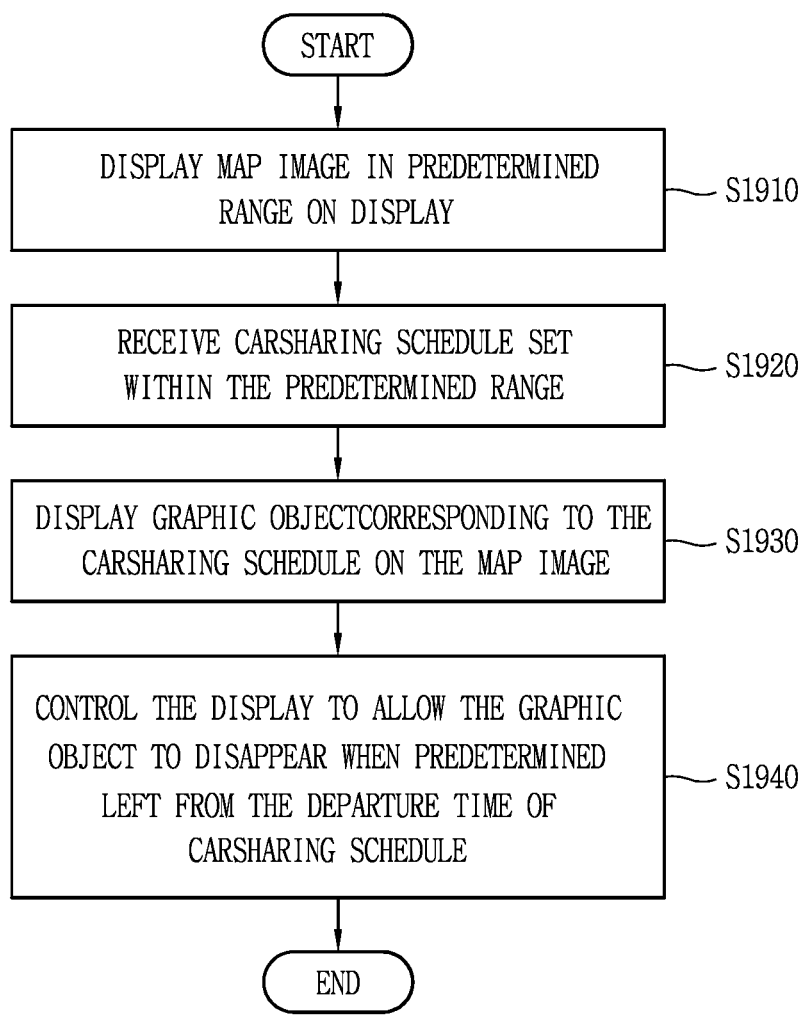
FIG. 19 is a flowchart illustrating a control method of a mobile terminal providing a transportation service according to an example of the present disclosure.

FIG. 19 is a flowchart illustrating a control method of a mobile terminal providing a transportation service according to an example of the present disclosure. The control method of FIG. 19 may be carried out by the client terminal 220 or the driver terminal 230 of FIG. 2.

First, the controller displays a map image in a predetermined range on the display (S1910). The map image may be included in an execution screen of an application and displayed on the display.

The predetermined range denotes a range of a region displayed on the display, and may vary according to a user input applied to the display. For example, when a pinch-in or pinch-out is applied, the predetermined range may be changed while changing a scale of the map image. For another example, when a flicking or drag input is applied, the predetermined range may vary while moving the center point of the map image. The center point of the map image may be changed as the mobile terminal moves.

Next, the server 210 receives a carsharing schedule set within the predetermined range (S1920). The controller may request a carsharing schedule set within the predetermined range to the server 210 whenever the predetermined range is changed.

Upon receiving at least one carsharing schedule set within the predetermined range from the server 210, the controller displays a graphic object corresponding to the carsharing schedule on the map image (S1930). When there is one received carsharing schedule, one graphic object is displayed, and when there are two received carsharing schedules, two graphic objects are displayed.

Here, the graphic object may be an image for guiding a carsharing schedule, and may be a different image depending on the type of carsharing schedule. For an example, the image may be different according to a vehicle reserved for the carsharing schedule, or may be different depending on a reservation person who generates the carsharing schedule. For another example, the image may be different depending on the remaining time until the departure time of the carsharing schedule. Here, a different image denotes an image having a different shape, length, color, and the like, for example.

The graphic object may be displayed at a position corresponding to the departure place of the carsharing schedule, and may include an estimated fare to be charged at the time of carsharing. Moreover, the graphic object may further include a comparison fare to be charged when using the same vehicle alone without carsharing. For example, an estimated fare for carsharing use and a comparative fare for single use may be displayed at the same time. As a result, a passenger who uses a carsharing service may select whether to use the vehicle alone or for carsharing through price comparison.

Next, the controller controls the display so that the graphic object disappears when a predetermined time is left from the departure time of the carsharing schedule.

A departure point and a departure time are determined for a carsharing schedule, and a vehicle reserved for the carsharing schedule starts a transportation service when the departure time is reached. A passenger who makes an additional reservation should be able to move to the departure point by the departure time, and the predetermined time period may be defined as a time required for the passenger to move to the departure point by the departure time. It is because the relevant carsharing schedule is meaningless to the passenger when the passenger making an additional reservation is unable to reach the departure point by the departure time.

Specifically, the mobile terminal may further include a sensing unit configured to sense a current position, and the predetermined time period may vary depending on the current position. The controller calculates an estimated travel time from a current position to a departure point of the carsharing schedule, and determines the predetermined time based on the calculated travel time. The vehicle starts to move at the departure time of the carsharing schedule, but when the user of the terminal is unable to reach the departure point by the departure time, the user is not provided with the carsharing schedule.

A passenger who wants to use a transportation service may create his or her own carsharing schedule. Since the sharing schedule is shared with a third party, the passenger may not only book his or her own vehicle in advance, but also collect passengers to use the vehicle together. As a result, the passenger may lower the cost, and the driver may plan a transportation schedule and increase the revenue.

FIGS. 20A through 20E are conceptual views for explaining an operation of a mobile terminal according to the control method of FIG. 19. The display 2000 of the mobile terminal is illustrated in FIGS. 20A through 20E.

A map image in a predetermined range is displayed on the display 2000, and a current location 2010 of the mobile terminal is displayed at one point of the map image. Moreover, when a carsharing schedule set in the predetermined range is received from the server 210, a graphic object corresponding to the carsharing schedule is displayed on the map image.

Figure 20A:
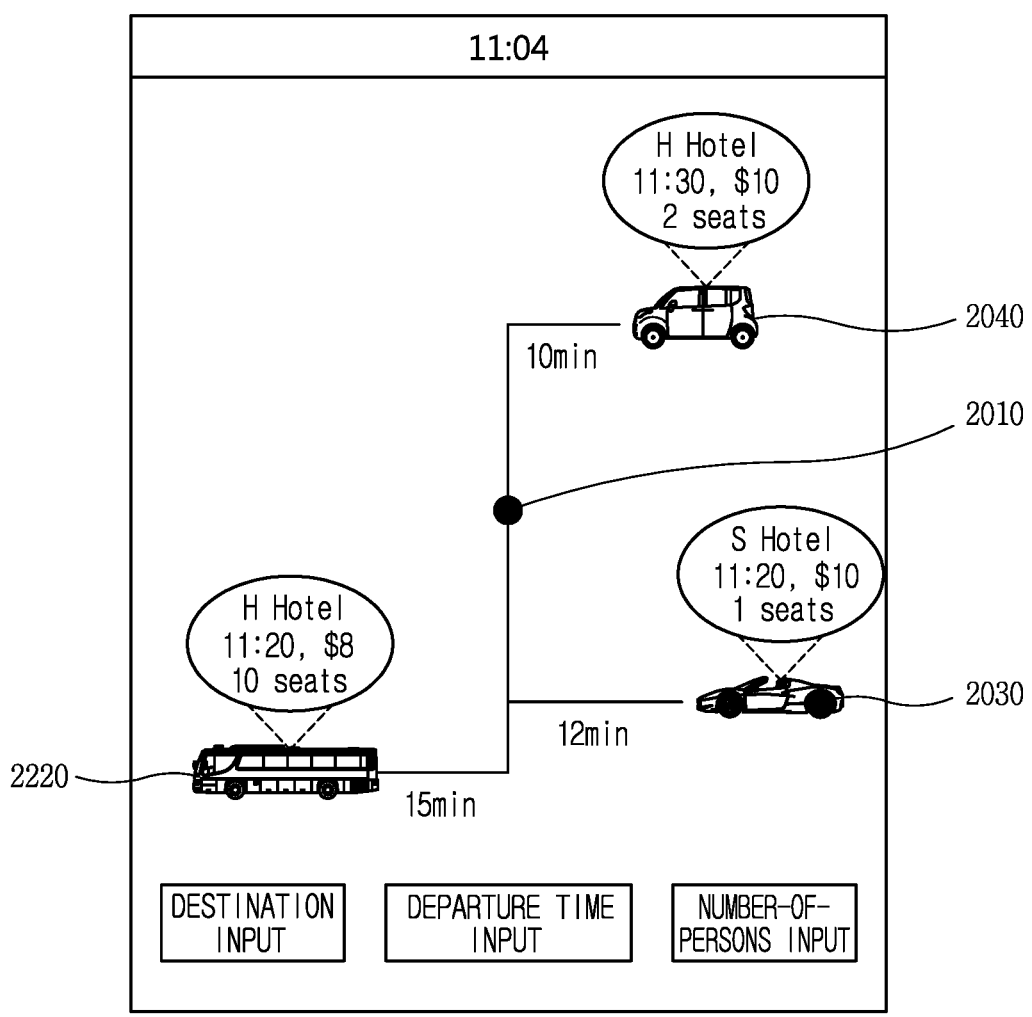
FIGS. 20A through 20E are conceptual views for explaining an operation of a mobile terminal according to the control method of FIG. 19.

Hereinafter, embodiments of the present disclosure will be described on the assumption that three carsharing schedules are received at the mobile terminal. FIG. 20A illustrates a case where a total of three carsharing schedules are received.

A graphic object corresponding to a carsharing schedule includes information on the carsharing schedule. At least one of a departure point, a destination point, a departure time, a remaining number of seats, a number of carsharing applicants, a type of vehicle, and an estimated fare of the sharing schedule may be included therein.

For example, a first carsharing schedule (2020) has a destination of H hotel and the vehicle departs at 11:20. There are eight seats left in the first carsharing schedule (2020), and the type of vehicle to provide a transportation service is a bus, and an estimated fare is 8 dollars. For another example, a second carsharing schedule (2030) has a destination of S hotel and the vehicle departs at 11:20. There is one seat left in the second carsharing schedule (2030), and the type of vehicle to provide a transportation service is a convertible.

As described above, the user of the mobile terminal may confirm a carsharing schedule registered in a predetermined region using a graphic object displayed on a map image.

Each graphic object may be displayed at a position corresponding to a departure point of each carsharing schedule. Moreover, a travel path and a time taken from the current location 2010 of the mobile terminal to each departure point may be displayed on the display 2000. For example, it takes 15 minutes to the departure point of the first carsharing schedule 2020, and 12 minutes to the departure point of the second carsharing schedule 2030.

On the other hand, when a predetermined time is left from the departure time of a specific carsharing schedule, a graphic object corresponding to the specific carsharing schedule disappears from the display 2000. The predetermined time varies depending on the carsharing schedule and varies depending on the current location 2010 of the mobile terminal.

For example, as illustrated in FIG. 20A, it takes 15 minutes to move to the departure point of the first carsharing schedule 2020, but 16 minutes is left to the departure time (11:20) with respect to the current time (11:04), and thus a graphic object corresponding to the first carsharing schedule is displayed on the display 2000. A predetermined time for the first carsharing schedule 2020 may be set to 15 minutes, and a predetermined time for the second carsharing schedule 2030 may be set to 12 minutes.

Figure 20B:
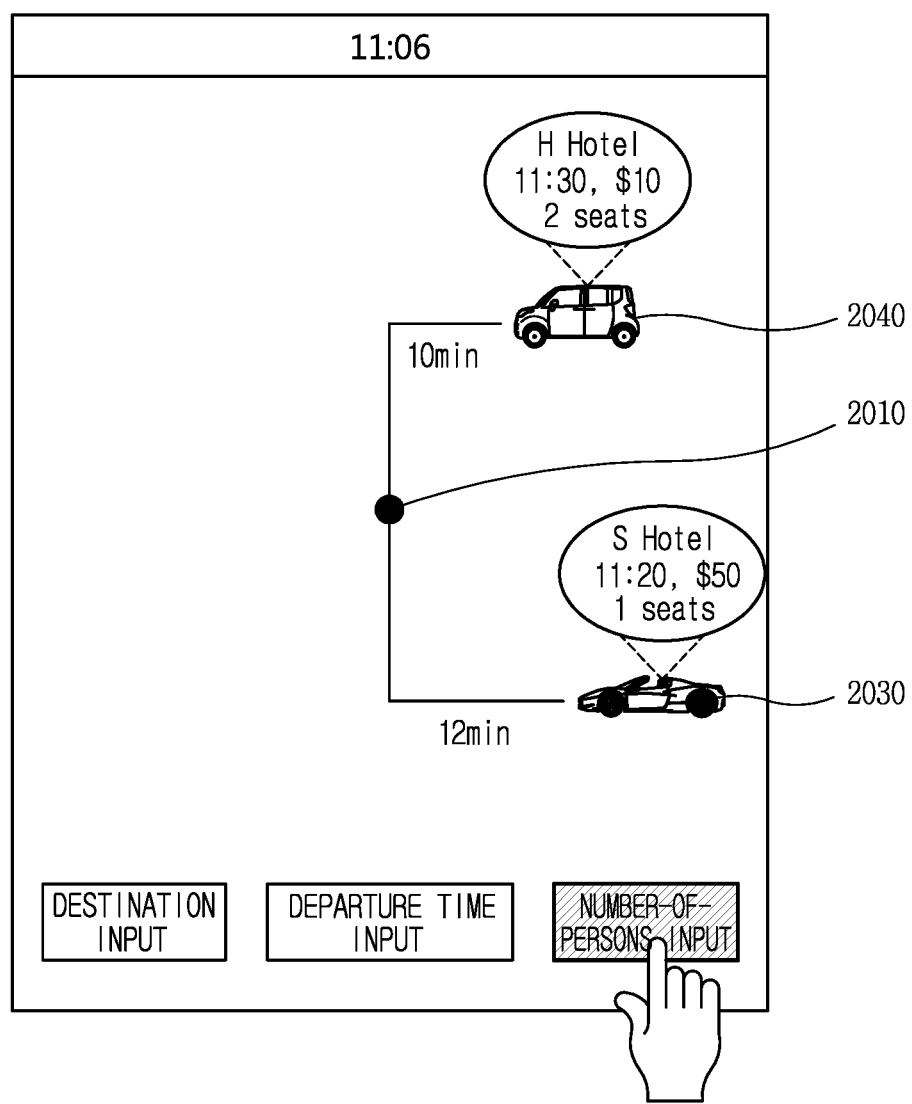

Then, as illustrated in FIG. 20B, the user is unable to move to the departure point of the first carsharing schedule 2020 with respect to the current time (11:06), the graphic object corresponding to the first carsharing schedule 2020 disappears from the display 2000. Each of the other carsharing schedules 2030, 2040 satisfies a predetermined condition (each predetermined time remaining from each departure time), and thus a graphic object of each of the other carsharing schedules 2030, 2040 is displayed on the display 2000 as it is.

Meanwhile, the mobile terminal may provide a menu for inputting at least one carsharing condition among a destination input, a departure time input, and a number-of-persons input. The mobile terminal may filter a carsharing schedule to be displayed in a predetermined region based on the carsharing condition input from the user.

Specifically, when a carsharing condition is input from the user, the input carsharing condition is transmitted to the server 210. The server 210 re-searches a carsharing schedule matching the carsharing condition and transmits it to the mobile terminal, and the mobile terminal displays a graphic object corresponding to the received carsharing schedule on a map image. In other words, the mobile terminal updates the displayed information based on the received carsharing schedule.

Figure 20C:
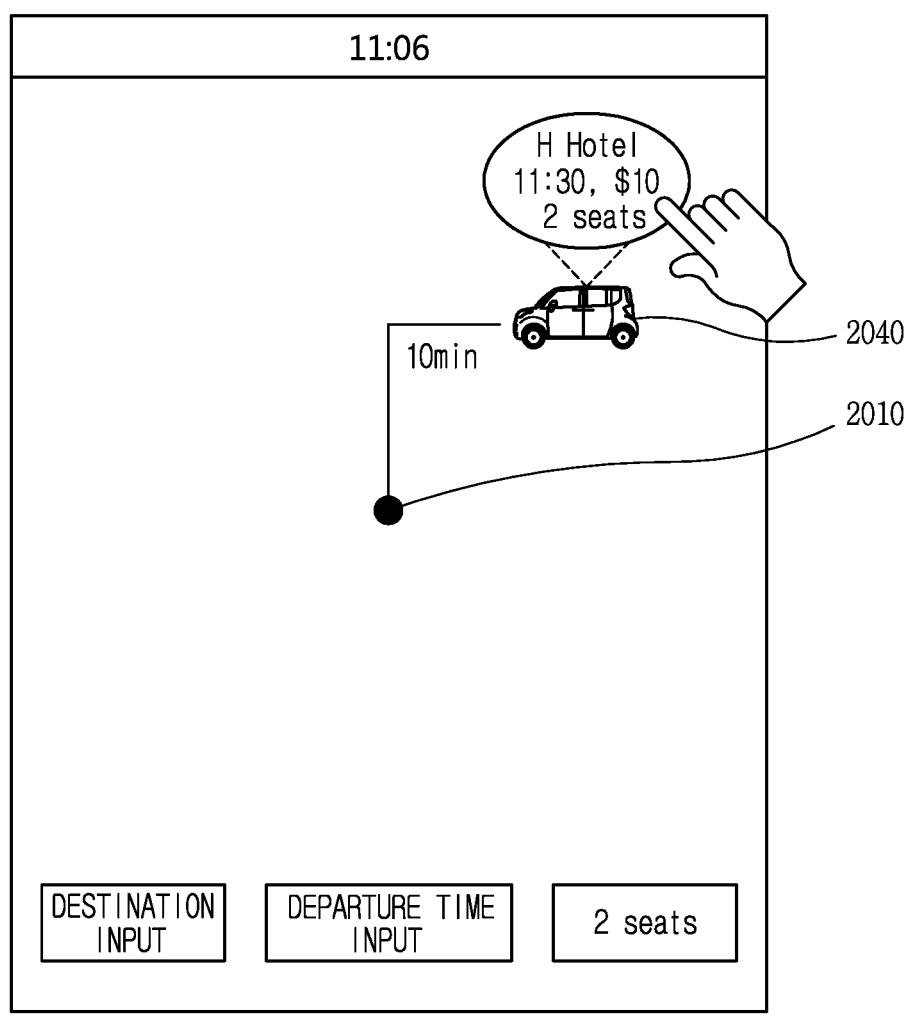

For example, as illustrated in FIG. 20B, a graphic object of the second carsharing schedule 2030 and a graphic object of the third carsharing schedule 2040 satisfying a predetermined condition on the basis of the current time (11:06) may be displayed on the map image. When a number of persons to use the transportation service is two, a carsharing schedule to be used by two persons is re-searched, and the re-searched carsharing schedule is displayed on the display (2000). As illustrated in FIG. 20C, the graphic object of the second carsharing schedule 2030 with one remaining seat disappears from the display 2000, and the graphic object of the third carsharing schedule 2040 with two remaining seats is displayed on the display 2000.

Though not illustrated in the drawing, the carsharing schedule can be re-searched in various ways according to a carsharing condition input by the user.

On the other hand, when a touch is applied to a graphic object corresponding to the carsharing schedule, the mobile terminal controls the display 2000 to display the detailed information of the carsharing schedule. The detailed information includes information on one or more passengers registered in the carsharing schedule.

Figure 20D:
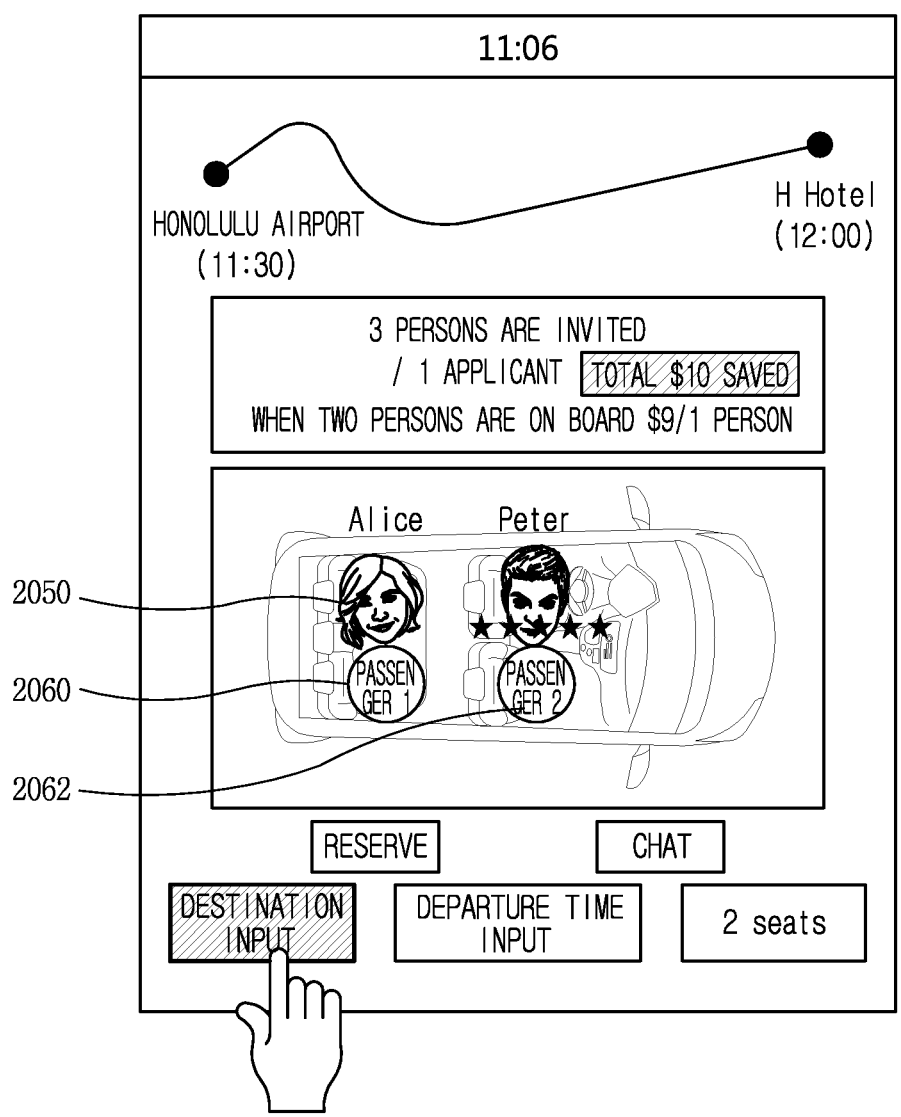

For example, when a touch is applied to a graphic object of the third carsharing schedule 2040 as illustrated in FIG. 20C, the map image may disappear and the detailed information of the third carsharing schedule 2040 may be displayed on the display 2000 as illustrated in FIG. 20D.

The detailed information may include at least one of a departure point, a departure time, a first destination point, a first estimated arrival time, a first travel path from the first departure point to the first arrival point, a maximum number of carsharing numbers, and an estimated fare.

The estimated fare may vary depending on a carsharing condition. For example, in the case of FIG. 20D, since the number of persons to use the transportation service is two, the estimated fare may be calculated based on two persons.

When the detailed information is displayed, a reservation menu capable of making a carsharing request may be additionally displayed on the carsharing schedule. When a touch is applied to the reservation menu, a carsharing request is transmitted to the server 210, and the server 210 adds a new passenger to the carsharing schedule.

Moreover, when the detailed information is displayed, a chat menu capable of chatting with applicants who have made a request on the carsharing schedule may be additionally displayed. When a touch is applied to the chat menu, a chat screen is displayed on the display 2000, and the user may send and receive messages with carsharing users through the chat screen.

The detailed information may further include a seat position of each of one or more passengers reserved in a carsharing schedule. When the detailed information is output, a seat image that guides the seats of the vehicle is displayed on the display 2000, and reservation unavailable seats since they are already reserved for passengers and reservation available seats may be displayed in a different way. For example, as illustrated in FIG. 20D, when Alice has already applied for carsharing, a photo image 2050 registered by Alice may be displayed on the seat of Alice.

At the time of carsharing request, the user of the mobile terminal may select his or her seat using his or her own terminal. For convenience of selection, the mobile terminal may display icons 2060, 2062 corresponding to the number of persons to whom an application for carsharing is to be made on the seat image. The mobile terminal may move at least one of the icons 2060, 2062 based on a touch input applied to the display 2000, and may reserve a seat for the user to ride on based on the moved position.

A photo image registered by the driver may also be displayed on the drivers seat, and an evaluation index for the driver may be displayed by various images.

On the other hand, the way in which the vehicle travels differs from country to country. In the country where the passenger travels on the right, the passenger performs boarding or getting off using the right door of the vehicle. For the sake of passenger safety, it is common that the left door is locked so as not to open.

A different destination point may be set for each carsharing passenger during the carsharing. For example, the first team may have a first destination point as a destination place, and the second team may have a second destination point as a destination place. The server 210 sets either one of the first and second destination points as a waypoint, and calculates a route to set the other one as a destination place, and the driver terminal 230 outputs direction information for guiding the route. Either one of the first team and the second team having the either one as a destination place gets off, and then the other team having the other one as a destination place gets off. In other words, it causes a difference in the order of getting off because the destination place is different.

The mobile terminal according to the present disclosure may set a seat position assigned to each passenger differently according to the destination of each passenger to allow clients using carsharing to efficiently get off the vehicle.

For example, the destination of the first team including Alice may be H hotel. As illustrated in FIG. 20D, either one of the second team including passenger 1 and passenger 2 may input a new destination S hotel to his or her own terminal.

The mobile terminal transmits a new destination to the server 210, generates a new route in consideration of the first and second destinations (H hotel, S hotel), and then calculates an estimated fare according to the new route. Moreover, the server 210 determines seat positions of Alice, passenger 1 and passenger 2 based on the new route, and transmits the determined seat positions to the mobile terminal. As the second destination is added, the route is changed, the estimated fare is changed, and the seat positions of passengers are changed.

Figure 20E:
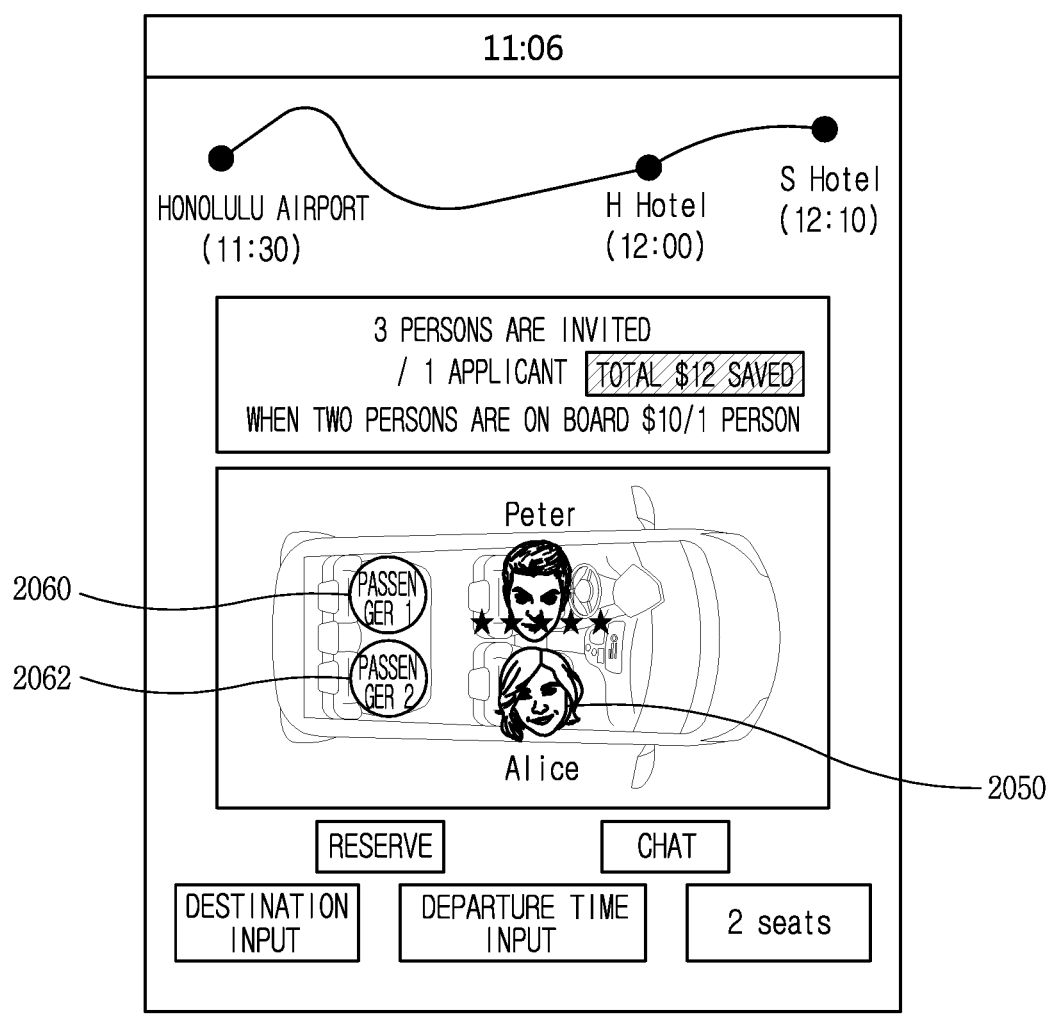

As illustrated in FIG. 20E, the mobile terminal updates detailed information that was being displayed based on information received from the server 210.

An optimal seating arrangement may be determined according to the destination of each of passengers using carsharing, and the determined seating arrangement may be guided through the terminal of each of the passengers. Through this, the passengers may be seated at optimal seats suitable for their destinations, thereby preventing the inconvenience of carsharing in advance.

Figure 21:
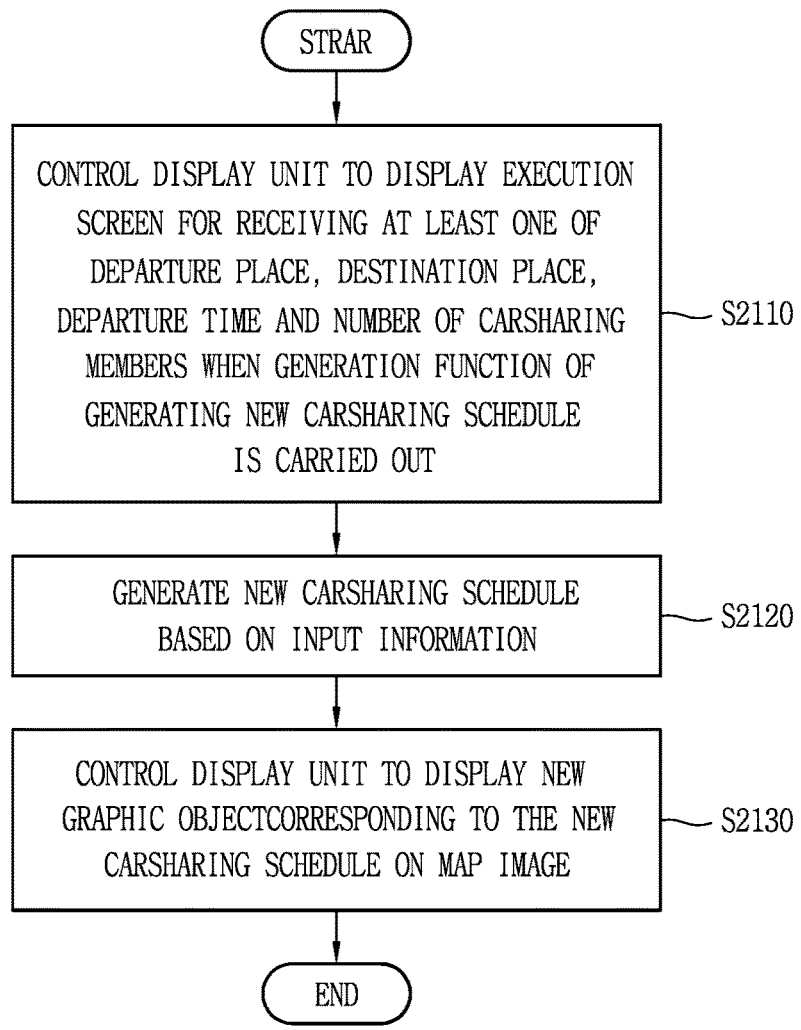
FIG. 21 is a flowchart for explaining a method of generating a new carsharing schedule using a mobile terminal.

FIG. 21 is a flowchart for explaining a method of generating a new carsharing schedule using a mobile terminal.

The mobile terminal may execute a generation function for generating a new carsharing schedule based on a user input. When the generation function is executed, the mobile terminal controls the display unit to output an execution screen for receiving at least one of a departure place, a destination place, a departure time, and a number of invited carsharing riders (S2110).

An estimated fare per person varies according to the number of invited carsharing riders, and the fare information calculated by the estimated fare per person may be displayed on the execution screen. As the number of invited carsharing riders increases, further discounts will be made.

Next, a new carsharing schedule is generated based on input information (S2120). The mobile terminal controls the wireless communication unit so that the generated carsharing schedule is registered in the server 210.

Next, the display unit is controlled so that a new graphic object corresponding to the new carsharing schedule is displayed on the map image (S2130).

The driver may create a new carsharing schedule through the driver terminal 230. The passenger may create a new carsharing schedule through the client terminal 220. Through this, the driver may manage his or her own driving schedule, and passengers may save money.

Figure 22:
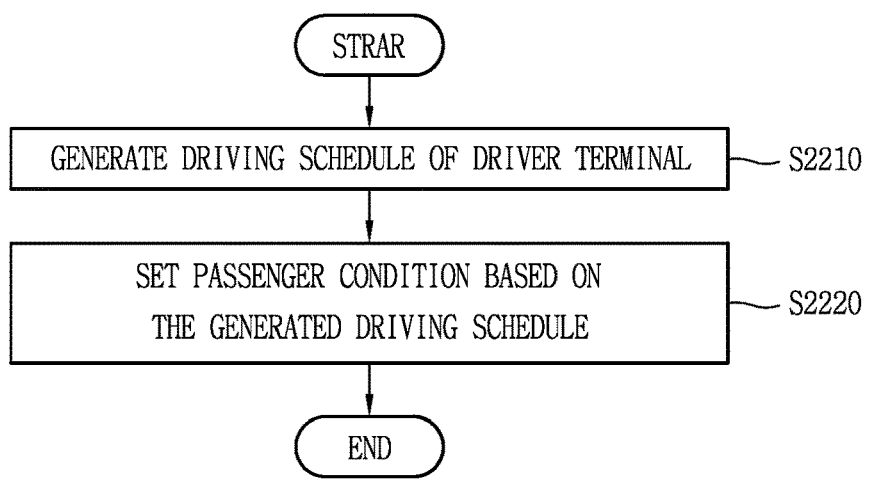
FIG. 22 is a flowchart for explaining a control method of a mobile terminal capable of providing a driver-oriented transportation service other than a passenger-oriented transportation service.
Figure 23:
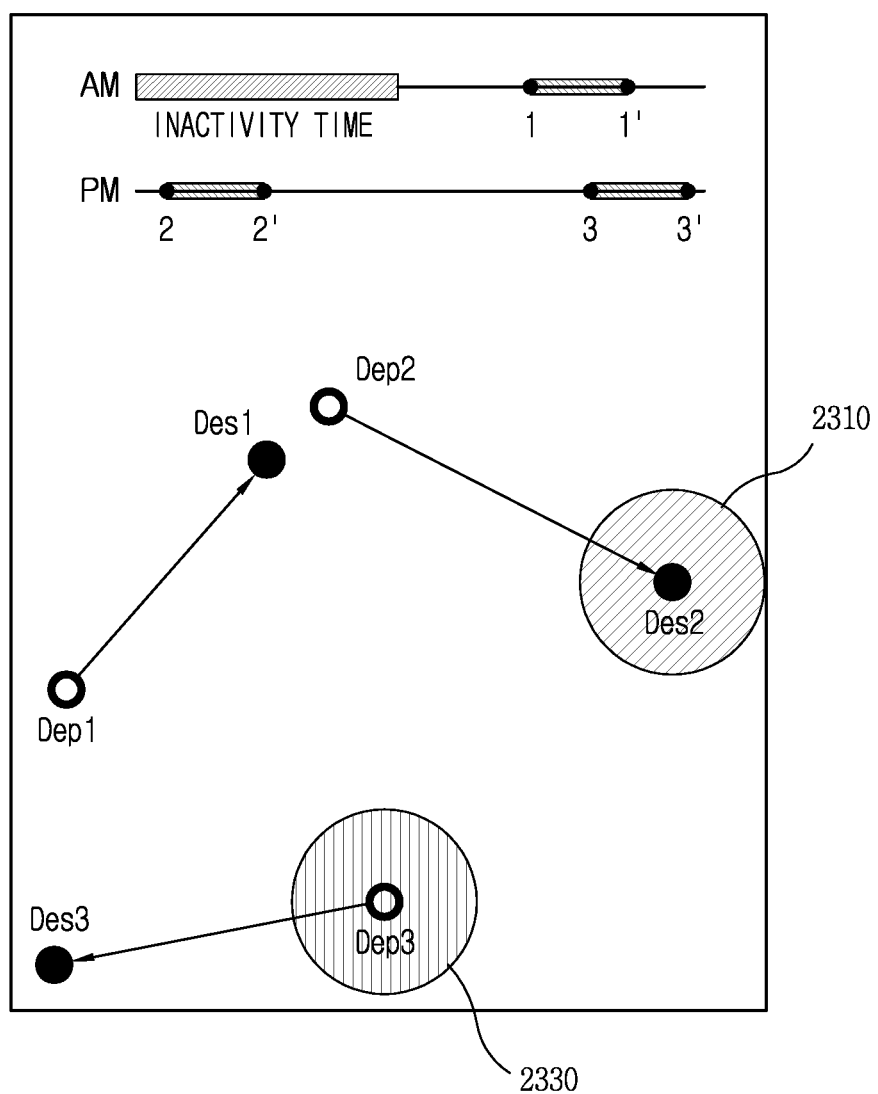
FIG. 23 is a conceptual view for explaining the control method of FIG. 22.

FIG. 22 is a flowchart for explaining a control method of a mobile terminal capable of providing a driver-oriented transportation service other than a passenger-oriented transportation service, and FIG. 23 is a conceptual view for explaining the control method of FIG. 22, In the related art, passengers have been provided with transportation services through arbitrary drivers. There are user needs of passengers who want to select their own drivers, and there are user needs of drivers who want to attract regular passengers.

In light of these user needs, the transportation system according to the present disclosure provides reservations for transportation services. For example, a carsharing schedule described above in FIG. 19 may be reserved, or a single schedule using the vehicle alone may be reserved. Moreover, the transportation system may provide a reservation management interface that allows reservations for transportation services to be managed.

First, the server 210 may generate a driving schedule of the driver terminal 230 (S2210).

The driver may set a passenger condition using the driver terminal 230, and the passenger condition may include at least one of an operable time and an inoperable time. The operable time denotes a time in which reservations are available, and the inoperable time denotes a time in which reservations are unavailable. The driving schedule is generated based on the operable time, and the inoperable time is excluded from the driving schedule.

A reservation for a transportation service may be carried out in a way that a passenger's request is approved by a driver or in a way that the driver's request is approved by a passenger. When the reservation of the transportation service is made, the relevant reservation is added to the driving schedule of the driver terminal.

The driver may check his or her own driving schedule through the driver terminal 230. For example, as illustrated in FIG. 23, a timeline may be displayed on the display 2300 of the driver terminal 230. The timeline may be a bar image with time as a variable.

Highlighting processing may be carried out during the inoperable time so that the operable time and the inoperable time are distinguished during the timeline.

When there is a reservation, reservation guide information for guiding a departure point and a destination point of the reservation may be displayed on the timeline. The reservation guide information is displayed on the timeline to reflect the departure time at the departure point and the estimated arrival time at the destination point. The estimated arrival time depends on traffic volume and is reflected on the timeline in real time.

On the other hand, the driving schedule may include a map image, and display a travel route of the reservation. For example, as illustrated in FIG. 23, a first departure (Dep1) and a first destination (Des1) of a first reservation are displayed on a map image, and a second departure (Dep2) and a second destination (Des2) may be displayed on the map image.

The driver terminal 230 or the server 210 may set a passenger condition of the driver terminal 230 based on the generated driving schedule (S2220).

For example, referring to FIG. 23, there is a waiting time between a second reservation and a third reservation to receive a new reservation. The waiting time is from an estimated arrival time of the second destination (Des2) to a departure time of the third departure point (Dep3).

A first predetermined region 2320 based on the second destination (Des 2) of the second reservation may be set as a passenger boarding region so that profit for the waiting time is maximized. Moreover, a second predetermined region 2330 based on a third departure (Dep3) of the third reservation may be set as a passenger getting-off region.

When the server 210 receives a vehicle request with the first predetermined region as a departure and the second predetermined region as a destination, the server 210 may preferentially transmit a reservation request to the driver terminal 230.

The maximum revenue may be generated because the reservation request is preferentially transmitted to a driver providing high-quality services, and a transportation service is provided without wasting time according to the driving schedule.

The passenger may also check a driving schedule of a specific driver through the client terminal 220. When a departure point and a destination point are input to the client terminal 220, a time zone in which reservations are available may be displayed on the timeline. When a touch is applied to the timeline, the departure time is determined based on a point to which the touch is applied, and the estimated arrival time is calculated. The passenger may check a schedule of his or her desired driver through the driving schedule to make a reservation request.

Meanwhile, the transportation system 200 according to the present disclosure provides a user interface through which a passenger can simply set conditions of a vehicle request using his or her client terminal 220.

FIG. 24 is a flowchart for explaining a method of setting a condition of a vehicle request by a client terminal.

According to the present disclosure, a control method for controlling a client terminal may be provided to provide a transportation service, and the control method may be carried out by an application installed in the client terminal 210. The application may perform the control method using the controller of the client terminal 210.

Hereinafter, for the sake of convenience of description, the identification numbers of the respective components will be used with reference to FIGS. 1A through 1C.

The controller 180 controls the camera 121 and the touch screen 151 to display an image received from the camera 121 provided in the mobile terminal 100 (S2410).

For example, when an application for a vehicle request is executed, the controller 180 may activate the camera 121 to receive an image from the camera 121, and display the received image on the touch screen 151.

Next, the controller 180 may extract a passenger to use the transportation service from the image (S2430).

The user of the mobile terminal 100 may capture the passenger to use the transportation service using the camera 121 when there are a plurality of passengers using the transportation service.

The controller 180 may extract persons included in the image based on various algorithms, and filter a passenger to use the transportation service together with the user of the mobile terminal 100 among the extracted persons. For example, the controller 180 may filter people gathered in a predetermined region as passengers.

When passenger extraction is completed, the characteristics of the extracted passengers are set as a condition of the vehicle request. The controller 180 may calculate a total number of passengers from the image, and calculate the sex, height, and weight of each passenger. For example, when the characteristics of the extracted passengers include one male and one female in their 20s, the condition of the vehicle request may be set to two passengers and a sports car. For another example, when the characteristics of the extracted passenger have one person in a wheelchair in his or her 70s, the condition of the vehicle request may be set as a vehicle equipped with a wheelchair lift. In this manner, the controller 180 may set a condition of the vehicle request such as a type of vehicle based on the characteristics of passengers extracted from the image.

Furthermore, the controller 180 may search for baggage from the image. When the baggage are searched, the baggage are also included in the condition of the vehicle request. Specifically, the condition of the vehicle request may be defined as a vehicle on which a number of passengers extracted from the image are allowed to board while the searched baggage can be loaded.

Next, the controller 180 may request a candidate vehicle on which the extracted passenger can be boarded to the server 210 using the wireless communication unit 110, and receive one or more candidate vehicles from the server 210.

The controller 180 controls the touch screen 151 to display one or more candidate vehicles capable of providing the transportation service based on information received from the server 210 (S2450). More precisely, candidate vehicle information may be displayed on the touch screen 151.

The candidate vehicle information may include least one of a departure point, a destination point, a departure time, a remaining number of seats, a number of carsharing applicants, a type of vehicle, and an estimated fare of the candidate vehicle. The candidate vehicle information may be displayed in a list manner in which the candidate vehicle information is sequentially displayed along one direction or a graphic object corresponding to each candidate vehicle may be displayed on the map image. When a candidate vehicle is displayed on the map image, the candidate vehicle is displayed at the position where the candidate vehicle is located.

The one or more candidate vehicles vary depending on the characteristics of passengers extracted from the image. The characteristics of passengers may include at least one of a total number of passengers, sex, height, weight of each passenger, a size and type of baggage, and a number of baggage possessed by each passenger. Moreover, the one or more candidate vehicles may be vehicles on which the total number of passengers are allowed to board while the baggage can be loaded.

The controller 180 may select one of the one or more candidate vehicles based on a user input. Then, the controller 180 may transmit a vehicle request of a transportation service for the selected candidate vehicle to the server.

The controller 180 transmits a vehicle request for the selected candidate vehicle to the server 210, and the server 210 transmits a reservation request to the driver terminal 230 registered in the selected candidate vehicle. The server 210 mediates between the driver terminal 230 and the client terminal 210 when the driver terminal 230 approves the reservation request.

When one of candidate vehicles is selected, the controller 180 may display a pickup point by the selected candidate vehicle on the touch screen 151 together with the map image (S2470).

Then, the mobile terminal 100 may perform the operation of the client terminal 220 according to at least one of the embodiments described above with reference to FIGS. 10 through 18.

According to the present disclosure, the mobile terminal may automatically set a condition of a vehicle request using an image received from the camera, thereby eliminating the hassle of the user having to input vehicle requirement.

Figure 25A:
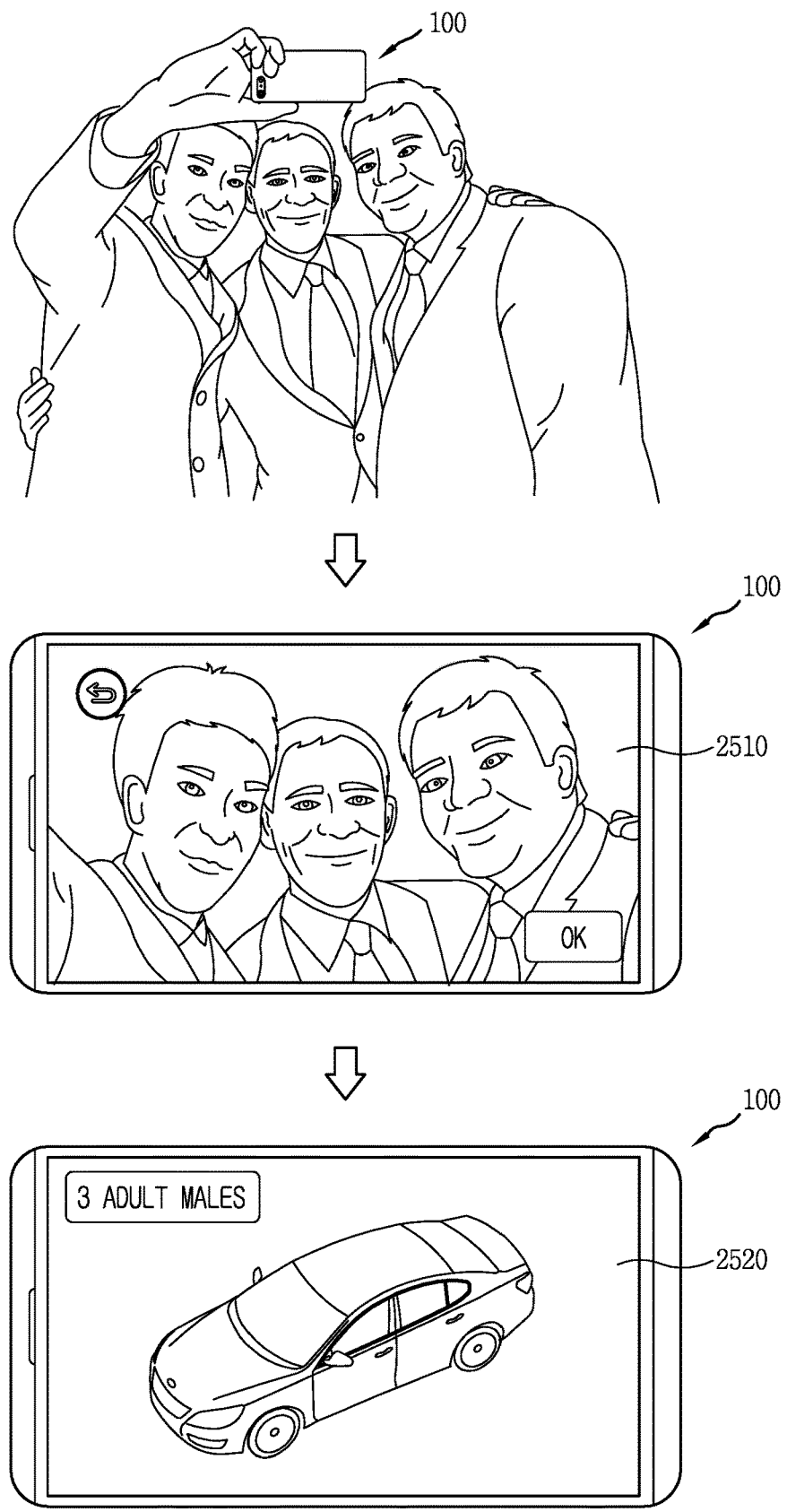
FIGS. 25A and 25B are exemplary views for explaining an operation of a client terminal according to the control method of FIG. 24.
Figure 25B:
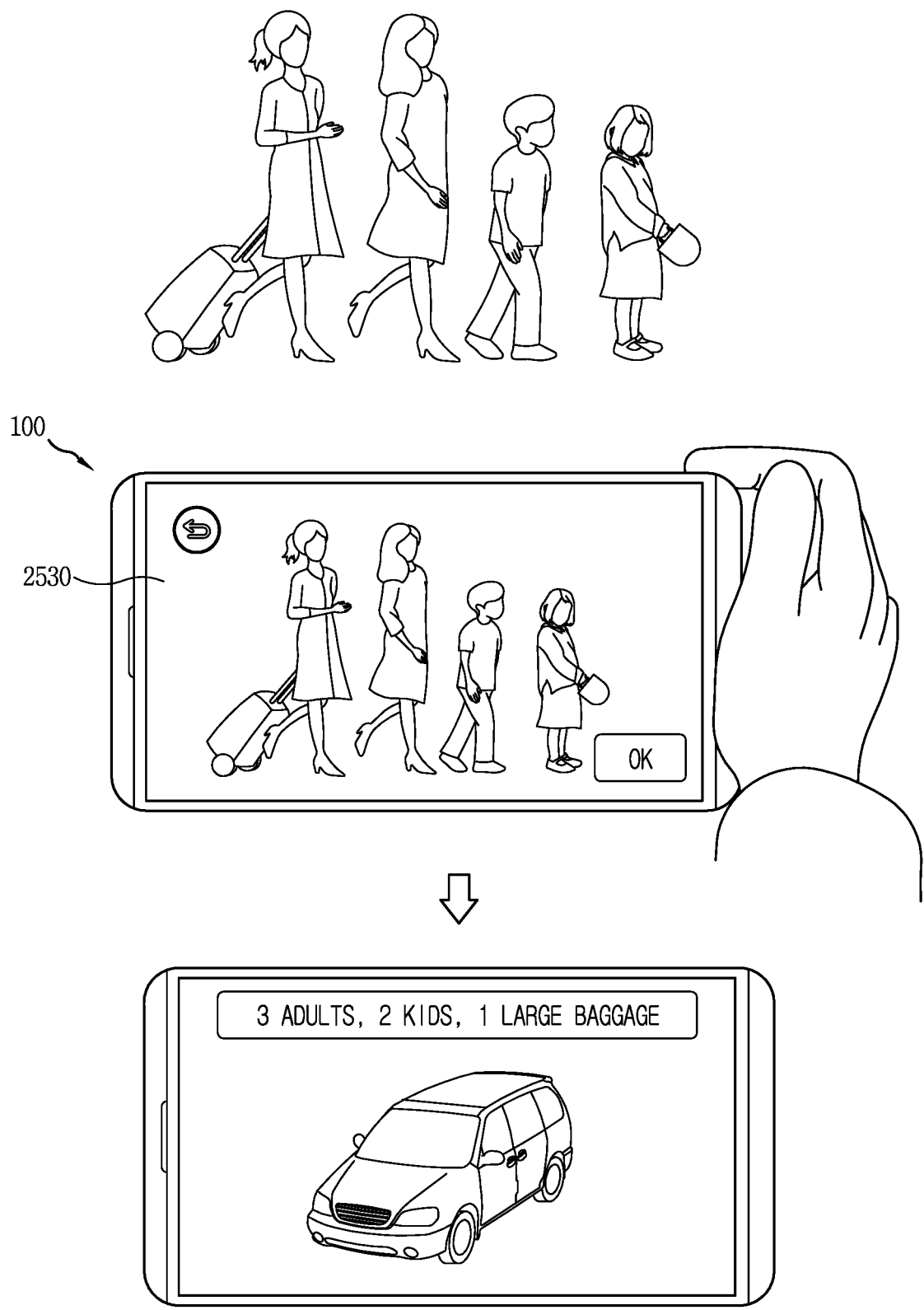

FIGS. 25A and 25B are exemplary views for explaining an operation of a client terminal according to the control method of FIG. 24.

The controller 180 determines the characteristics of the extracted passengers in a different way depending on whether an image extracted from the camera 121 is the front camera 121*a* disposed on a front side of the mobile terminal 100 or the rear camera 121*b* disposed on a rear side of the mobile terminal 100.

When a front image is captured by the front camera 121*a*, the user of the mobile terminal 100 may be included in the front image because the front camera 121*a* is used for capturing a self-portrait. Accordingly, the controller 180 sets the characteristics of a passenger using the passenger extracted from the front image.

For example, as illustrated in FIG. 25A, when a front image 2510 is captured by the front camera 121*a*, the controller 180 may extract three adult males based on the front image 2510, and set three adult males as a condition of the vehicle request to request a candidate vehicle to the server 210.

The server 210 searches for a sedan as a candidate vehicle for three adult males, and transmits the searched sedan to the mobile terminal 100. The controller 180 may display one or more candidate vehicles based on information received from the server 210, and display the characteristics of the extracted passengers together therewith. In other words, the front image 2510 may be switched to a vehicle recommendation screen 2520 including the one or more candidate vehicles.

In contrast, when a rear image is captured by the rear camera 121*b*, the user of the mobile terminal is located at the front of the mobile terminal 100, and thus the user of the mobile terminal is not included in the rear image. In consideration of this, the controller 180 may add the user of the mobile terminal to the passengers extracted from the rear image to set the characteristics of the passengers.

For example, as illustrated in FIG. 25B, when the rear image 2530 is captured by the rear camera 121*b*, the controller 180 may extract passengers from the rear image 2530. According to the example of FIG. 25B, two children, two adult females and one carrier may be extracted.

The controller 180 may further add a passenger set as the user of the mobile terminal 100 to the characteristics of the extracted passengers. In this case, two children, two adult females, one adult male and one carrier may be set as a condition of the vehicle request.

Accordingly, the candidate vehicle displayed on the touch screen 151 may be limited to a vehicle on which the extracted number of passengers are allowed to board while the extracted baggage can be loaded.

The user characteristics of the mobile terminal may be preset by a user input. When the user's picture of the mobile terminal is stored in the memory 170 or the like, even if a rear image is captured by the rear camera 121*b*, the controller 180 may determine whether or not the user of the mobile terminal is included in the rear image by comparing the rear image with the user image. According to the determination result, whether or not to add the user of the mobile terminal to the extracted passengers may be determined.

On the other hand, when a user input is received while an image captured from the camera 121 is being displayed on the touch screen 151, passengers may be re-extracted based on the user input.

Figure 26:
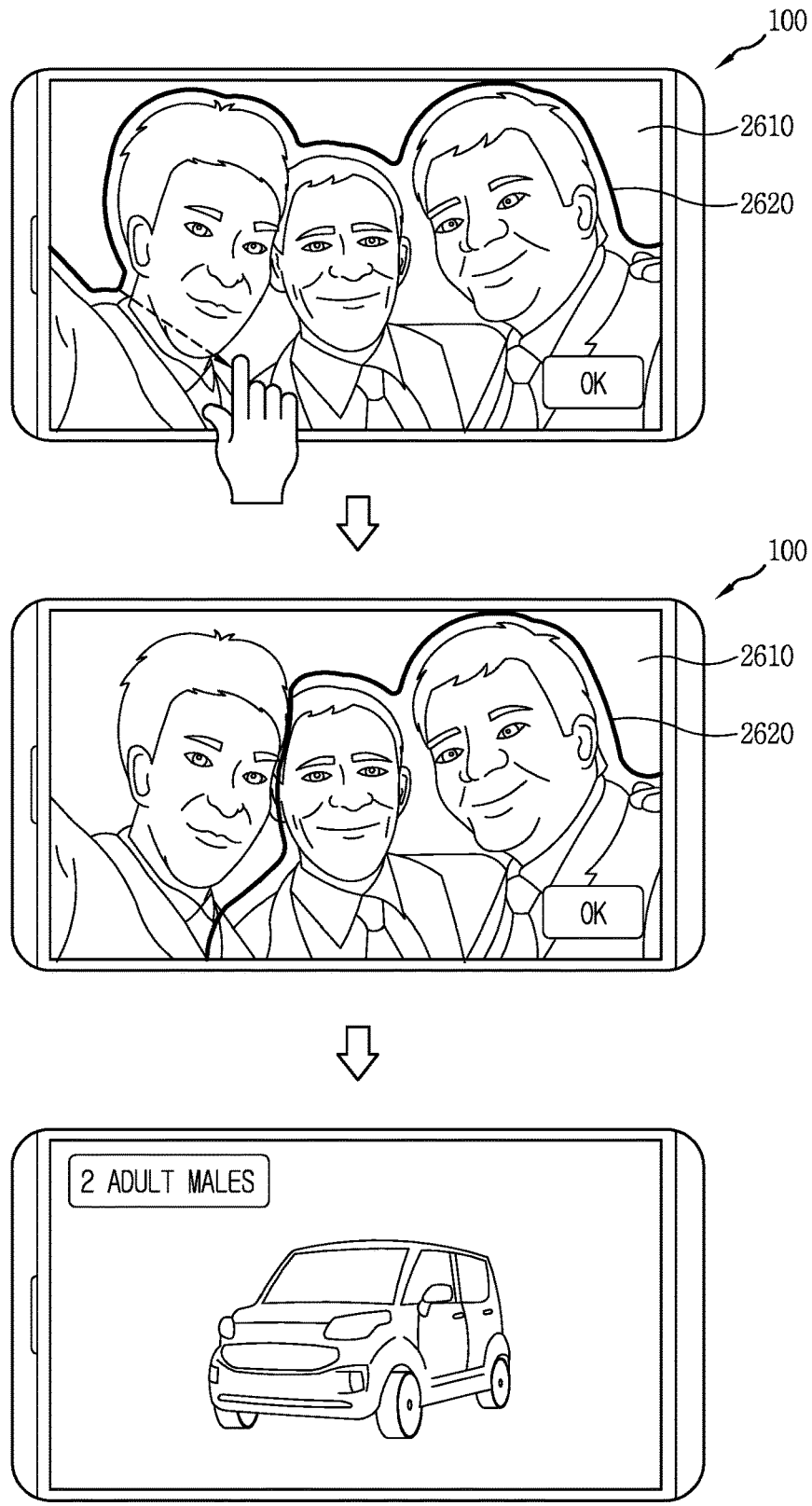
FIG. 26 is an exemplary view for explaining a method of resetting a condition of a vehicle request based on a user input.

FIG. 26 is an exemplary view for explaining a method of resetting a condition of a vehicle request based on a user input.

When the image 2610 captured from the camera 121 is displayed on the touch screen 151, the controller 180 controls the touch screen 151 in such a manner that a guide line 2620 for guiding passenger extraction is displayed on the image 2610. The passenger extraction is carried out in at least one region defined by the guide line within the entire region of the image 2610.

More specifically, the controller 180 may classify the entire region of the image 2610 into a first region and a second region using a guide line. Then, the controller 180 may extract passengers from the first region and ignore the second region. In other words, persons and/or baggage included in the second region are excluded from setting a condition of the vehicle request.

Moreover, when a touch input is applied to the guide line 2620, the controller 180 controls the touch screen 151 in such a manner that the guide line 2620 is modified based on the touch input.

As the guide line 2620 varies, the first region and the second region are reclassified, and passengers for setting the condition of the vehicle request is re-extracted. For example, according to the embodiment of FIG. 26, the condition of the vehicle request may be reset to two adult males from three adult males with a variation of the guide line 2620.

The user may control the mobile terminal 100 using the guide line 2620 so that the condition of the vehicle request is more accurately set.

On the other hand, when baggage is searched, the mobile terminal 100 may provide a user interface related to the baggage.

Figure 27A:
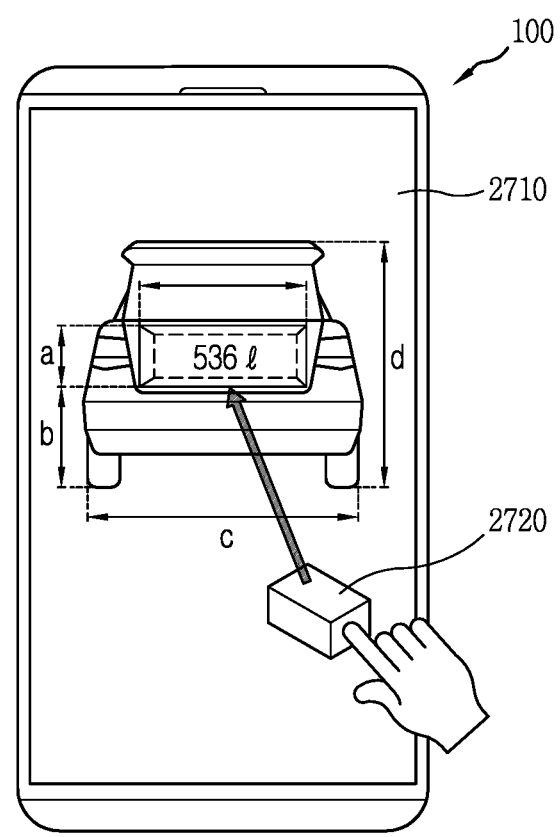
FIGS. 27A and 27B are conceptual views for explaining an operation of a client terminal related to baggage.
Figure 27B:
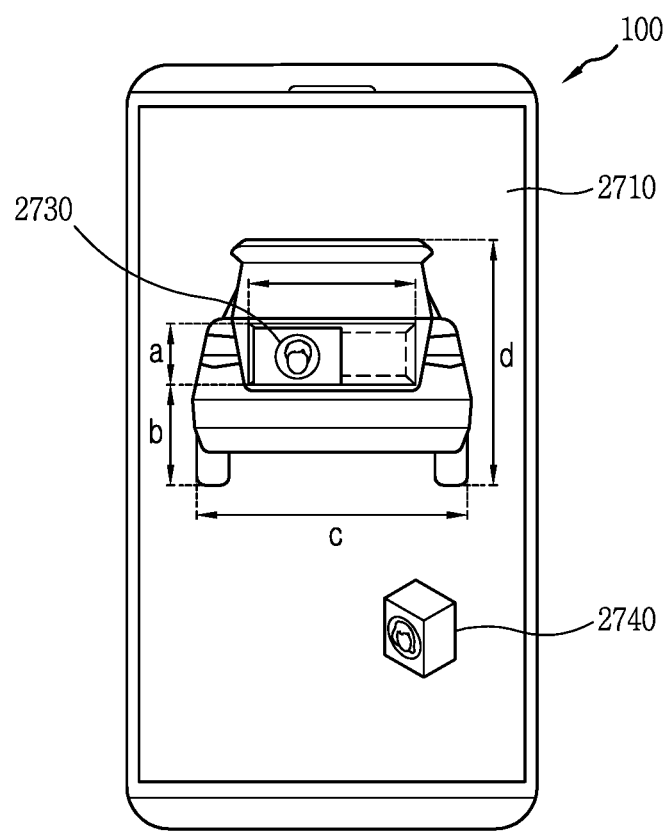

FIGS. 27A and 27B are conceptual views for explaining an operation of a client terminal related to baggage.

When baggage is searched, the controller 180 may control the touch screen 151 to display a storage compartment image of a candidate car in which the baggage can be loaded, in displaying the candidate car information. It is to allow the user of the mobile terminal 100 to confirm a loading space of the candidate vehicle, and to provide more accurate information in selecting the vehicle.

For example, as illustrated in FIG. 27A, the storage compartment image 2710 may be an image for guiding a size of the storage compartment of the candidate vehicle.

Although not shown in the drawing, the storage compartment image 2710 may be an image captured by a camera disposed in a trunk of the candidate vehicle. When the storage compartment image 2710 is an actually captured image, the user of the mobile terminal 100 may check which objects are placed in a loading space of the candidate car, and whether the storage compartment of the candidate car is clean.

Meanwhile, when the storage compartment image 2710 is displayed, the controller 180 may display a graphic object 2720 corresponding to baggage searched from an image along with the storage compartment image 2710. When there are a plurality of searched baggage, a plurality of graphic objects corresponding to each baggage may be displayed.

The sizes of the storage compartment image 2710 and the graphic object 2720 are determined according to a reference scale, and the user may intuitively recognize a size of the candidate vehicle using the graphic object 2720.

The controller 180 may change the display position of the graphic object 2720 based on a touch input applied to the graphic object 2720. Moreover, the controller 180 may set a point at which baggage corresponding to the graphic object is loaded based on the position of the graphic object 2720.

Candidate vehicles may be operated in a carsharing manner. A transportation service according to the present disclosure is carried out to reserve a seat of a passenger as well as to reserve a position where the baggage is to be loaded.

For example, when a vehicle request by a first passenger with a first baggage is approved for reservation, a first space selected by the first passenger is exclusively used by the first passenger. The loading space of the relevant vehicle is limited to the remaining space excluding the first space.

On the other hand, as illustrated in FIG. 27B, the candidate vehicle may be scheduled to share with other passengers.

In this case, when guiding a loading space in which the baggage can be loaded, the controller 180 may divide the loading space into a first region in which the loading of the baggage is scheduled and a second region in which the loading of the baggage is not scheduled. Furthermore, the controller 180 may control the touch screen 151 so that a guide image 2730 for guiding the first region is displayed on the storage compartment image 2710.

The user of the mobile terminal 100 may visually confirm where his baggage can be loaded from the cargo container image 2710, the guide image 2730, and a graphic object 2740 corresponding to his or her baggage.

The guide image 2730 and/or the graphic object 2740 may further include owner information indicating the owner of the baggage. For example, the owner information may include at least one of an owner's name, an ID, a nickname, and a photograph.

On the other hand, when the reservation of the transportation service is completed, the mobile terminal 100 may guide the location of the driver terminal 230. Moreover, the mobile terminal 100 may provide a user interface that allows a user to more easily select a pickup point or intuitively recognize the selected pickup point.

Figure 28:
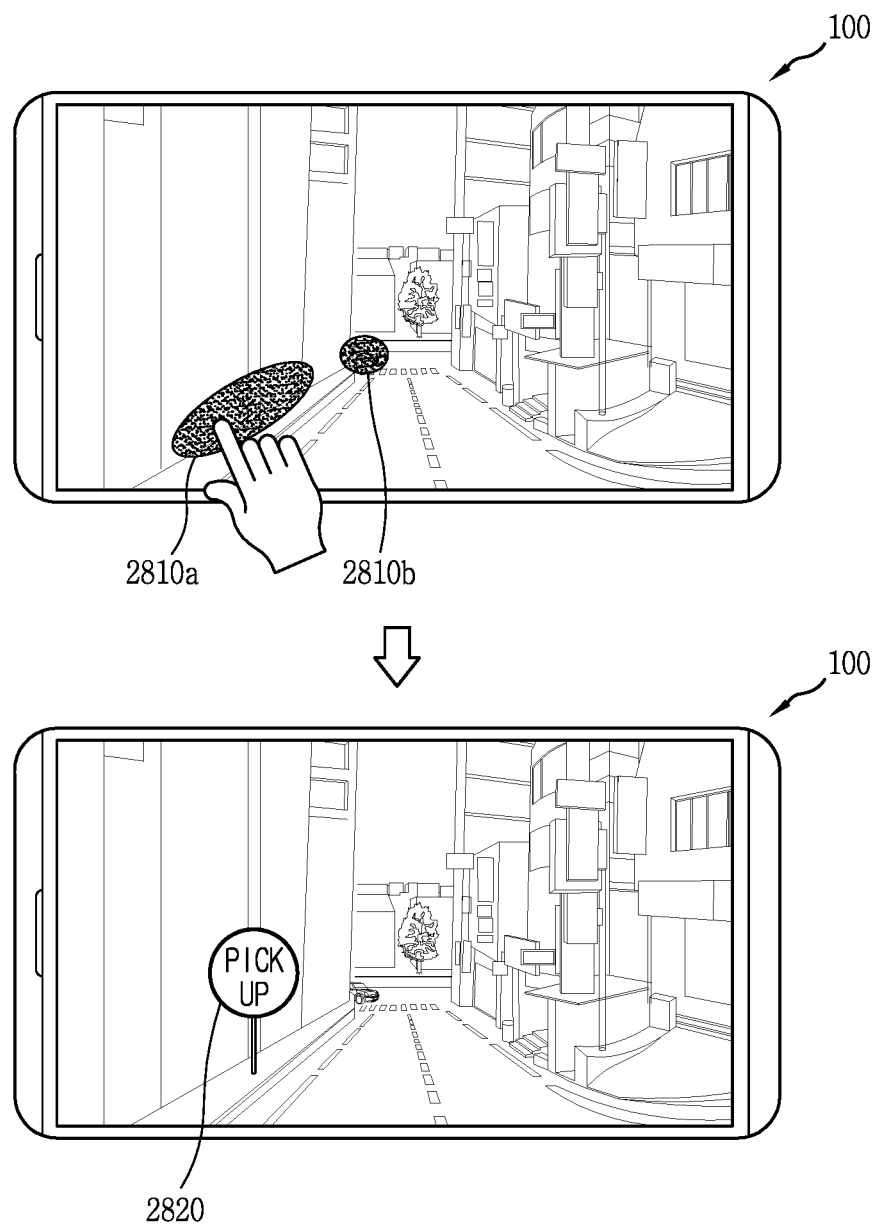
FIG. 28 is an exemplary view for explaining an operation of a client terminal that guides a pickup point for a passenger.

FIG. 28 is an exemplary view for explaining an operation of a client terminal that guides a pickup point for a passenger.

When a reservation of a transportation service is completed for any candidate vehicle, the controller 180 may control the touch screen 151 to display an image received from the camera 121 in response to the completion of the reservation or in response to a user request.

Moreover, as illustrated in FIG. 28, the controller 180 may display a pickup point guide image 2810a, 2810b for guiding a region where the any candidate vehicle is able to park on the image.

Specifically, the controller 180 searches at least one region in which the vehicle is able to park in a region included in the image. When a parking available region is searched, the controller may search a partial region corresponding to the parking available region from the image, and display the pickup point guide image 2810a, 2810b in the partial region.

When any one pickup point guide image is selected by a user input, the controller 180 may set a pickup point corresponding to the selected pickup point guide image, and transmit the set pickup point to the driver terminal 230 or the server 210 to set the set pickup point as a destination.

When the pickup point is set, the controller 180 displays an icon 2820 for guiding the pickup point on the image to realize augmented reality.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 980 of the mobile terminal. The foregoing to embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A method of controlling a mobile terminal to coordinate a transportation service, the method comprising:
   obtaining, through a camera of the mobile terminal, an image;
   displaying, through a touch screen of the mobile terminal, the obtained image;
   identifying, from the image, at least one of one or more passengers and at least one baggage;

based on at least one of the identified one or more passengers and the identified at least one baggage, determining characteristics of the transportation service;

based on the determination of the characteristics of the transportation service, transmitting, through a wireless communication unit of the mobile terminal to a server, a search request for a candidate vehicle;

receiving, from the server, information related to one or more candidate vehicles determined by the server to be capable of providing the transportation service, wherein the determination of whether a candidate vehicle is capable of providing the transportation service is based on (i) the characteristics of the transportation service, and (ii) an ability of the candidate vehicle to accommodate the identified one or more passengers and the identified at least one baggage;

displaying, through the touch screen, the one or more candidate vehicles capable of providing the transportation service; and based on the identification of the at least one baggage, displaying, through the touch screen, a storage compartment image of the candidate vehicle and a graphic object corresponding to the at least one baggage, wherein the storage compartment image and the graphic object are sized according to a reference scale, and wherein identifying, from the image, at least one of one or more passengers and at least one baggage comprises:
    displaying, through the touch screen, a guiding line for guiding the identification of at least one of the one or more passengers or the at least one baggage from the image;
    based on the guiding line, classifying the image into a first image region and a second image region;
    identifying, exclusively from the first image region, at least one of the one or more passengers or the at least one baggage;
    receiving, through the touch screen, a touch input for modifying the guiding line;
    based on the received touch input, modifying the guiding line;
    based on the modified guiding line, updating the first image region and the second image region; and
    based on the modified guiding line, identifying, exclusively from the updated first image region, at least one of the one or more passengers or the at least one baggage.

2. The method of claim 1, comprising:
setting a loading location of the at least one baggage based on a displayed position of the graphic object,
wherein the graphic object is moveable based on a touch input to the touch screen.

3. The method of claim 2, comprising:
displaying, through the touch screen, a guide image with the displayed storage compartment image and the graphic object,
wherein the storage compartment image comprises:
    a first region which is scheduled to be occupied; and
    a second region which is not scheduled to be occupied, and
wherein the guide image is positioned on the first region.

4. The method of claim 1, wherein the storage compartment image is an image captured by a camera disposed in a storage compartment of the candidate vehicle.

5. The method of claim 1, wherein the characteristics include a number of passengers, the method comprising:
determining whether the image was obtained through a front camera disposed on a front surface of the mobile terminal or a rear surface camera disposed on a rear surface of the mobile terminal;
based on the determination that the image was obtained through the rear surface camera, modifying the number of passengers; and
based on the determination that the image was obtained through the front camera, maintaining the number of passengers.

6. The method of claim 1, comprising:
receiving, through the mobile terminal, a user input selecting any one of the one or more candidate vehicles; and
based on the received user input, transmitting, through the wireless communication unit to the server, a reservation request for the transportation service by the selected candidate vehicle.

7. The method of claim 6, comprising:
determining that the selected candidate vehicle and the mobile terminal are located within a predetermined range;
based on the determination that the selected candidate vehicle and the mobile terminal are located within the predetermined range, displaying, through the touch screen, an authentication screen configured to aid a driver of the selected candidate vehicle in identifying a user of the mobile terminal.

8. The method of claim 6, comprising:
based on the transmission of the reservation request, obtaining, through the camera, a pickup location image;
displaying, through the touch screen, the pickup location image; and
displaying, through the touch screen, a pickup point selection guide image identifying a region of the pickup location image suitable for parking of the selected candidate vehicle.

9. The method of claim 8, comprising:
receiving, through the mobile terminal, a user input selecting the pickup point selection guide image;
based on the received user input selecting the pickup point selection guide image, setting a pickup point of the selected candidate vehicle.

10. The method of claim 1, comprising:
based on the information related to one or more candidate vehicles, determining that the one or more candidate vehicles are not present;
displaying, through the touch screen, a map image comprising a point corresponding to a location of the mobile terminal; and
displaying, on the displayed map image, at least one of
    a first graphic object identifying a first region, wherein a number of available vehicles located in the first region exceeds a number of passengers located in the first region by a first reference value, and
    a second graphic object identifying a second region, wherein a number of passengers located in the second region exceeds a number of available vehicles located in the second region by a second reference value.

11. The method of claim 10, comprising:
outputting, through the mobile terminal, route guide information configured to guide a user of the mobile terminal in moving from the location of the mobile terminal to a location within the first region.

12. The method of claim 11, wherein the outputting the route guide information comprises:
determining a mode of transportation for moving the user to the location within the first region; and
outputting, through the mobile terminal, the determined mode of transportation.

13. The method of claim 1, wherein the displaying the one or more candidate vehicles comprises:
- displaying, through the touch screen, a map image of a predetermined range around a predetermined point;
- displaying, on the displayed map image, the one or more candidate vehicles;
- determining that a departure time of at least one of the one or more candidate vehicles is within a predetermined time from a current time; and
- based on the determination that the departure time of the at least one of the one or more candidate vehicles is within the predetermined time from the current time, removing the at least one of the one or more candidate vehicles from display through the touch screen.

14. The method of claim 13, comprising:
- modifying the predetermined time based on a location of the mobile terminal.

15. The method of claim 14, wherein the modifying of the predetermined time based on the location of the mobile terminal comprises:
- calculating an estimated travel time from the location of the mobile terminal to a departure location set to the candidate vehicle; and
- modifying the predetermined time based on the estimated travel time.

16. A mobile terminal comprising:
- a touch screen;
- a camera;
- a wireless communication unit;
- at least one processor; and
- a computer-readable medium coupled to the at least one processor having stored thereon instructions which, when executed by the at least one processor, causes the at least one processor to perform operations comprising:
  - obtaining, through the camera, an image;
  - displaying, through the touch screen, the obtained image;
  - determining, from the image, characteristics of one or more passengers of a transportation service;
  - based on the determination of the characteristics of the one or more passengers, transmitting, through the wireless communication unit to a server, a search request for a candidate vehicle;
  - receiving, from the server, information related to one or more candidate vehicles determined by the server to be capable of providing the transportation service to the one or more passengers, wherein the determination of whether a candidate vehicle is capable of providing the transportation service to the one or more passengers is based on the characteristics of the one or more passengers;
  - displaying, through the touch screen, the one or more candidate vehicles capable of providing the transportation service to the one or more passengers; and
  - based on the identification of the at least one baggage, displaying, through the touch screen, a storage compartment image of the candidate vehicle and a graphic object corresponding to the at least one baggage, wherein the storage compartment image and the graphic object are sized according to a reference scale, and
- wherein determining, from the image, characteristics of one or more passengers of a transportation service comprises:
  - displaying, through the touch screen, a guiding line for guiding the identification of at least one of the one or more passengers or the at least one baggage from the image;
  - based on the guiding line, classifying the image into a first image region and a second image region;
  - identifying, exclusively from the first image region, at least one of the one or more passengers or the at least one baggage;
  - receiving, through the touch screen, a touch input for modifying the guiding line;
  - based on the received touch input, modifying the guiding line;
  - based on the modified guiding line, updating the first image region and the second image region; and
  - based on the modified guiding line, identifying, exclusively from the updated first image region, at least one of the one or more passengers or the at least one baggage.

* * * * *